United States Patent [19]
Chase

[11] Patent Number: 6,098,409
[45] Date of Patent: Aug. 8, 2000

[54] TEMPERATURE CONTROL OF HIGH TEMPERATURE SUPERCONDUCTING THIN FILM FILTER SUBSYSTEMS

[75] Inventor: David Chase, Santa Barbara, Calif.

[73] Assignee: Superconductor Technologies, Inc., Santa Barbara, Calif.

[21] Appl. No.: 09/204,897

[22] Filed: Dec. 3, 1998

[51] Int. Cl.[7] .................................................. F25B 9/00
[52] U.S. Cl. .................................................. 62/6; 62/908
[58] Field of Search ................................ 62/6, 908

[56] References Cited

U.S. PATENT DOCUMENTS

| | | | |
|---|---|---|---|
| 5,018,357 | 5/1991 | Livingstone et al. | 62/6 |
| 5,535,593 | 7/1996 | Wu et al. | 62/6 |
| 5,813,235 | 9/1998 | Peterson | 62/6 |

*Primary Examiner*—Henry Bennett
*Assistant Examiner*—Malik N. Drake
*Attorney, Agent, or Firm*—Lyon & Lyon LLP

[57] ABSTRACT

Systems and methods for regulating, for example, the temperature of high temperature superconducting (HTSC) thin film filters. A multi-stage temperature controller comprises a first loop and a second loop. The first loop is used to regulate the cold finger temperature of, for example, a Stirling cycle cryocooler, and the second loop is used to set a reference for the first loop based upon a comparison between a reference signal and a signal received from a cold stage temperature sensor. A filter loop also may be used to regulate the temperature of independent HTSC thin film filter carrier packages.

15 Claims, 25 Drawing Sheets

| FIG. 5D-1 | FIG. 5D-2 | FIG. 5D-3 |
|---|---|---|

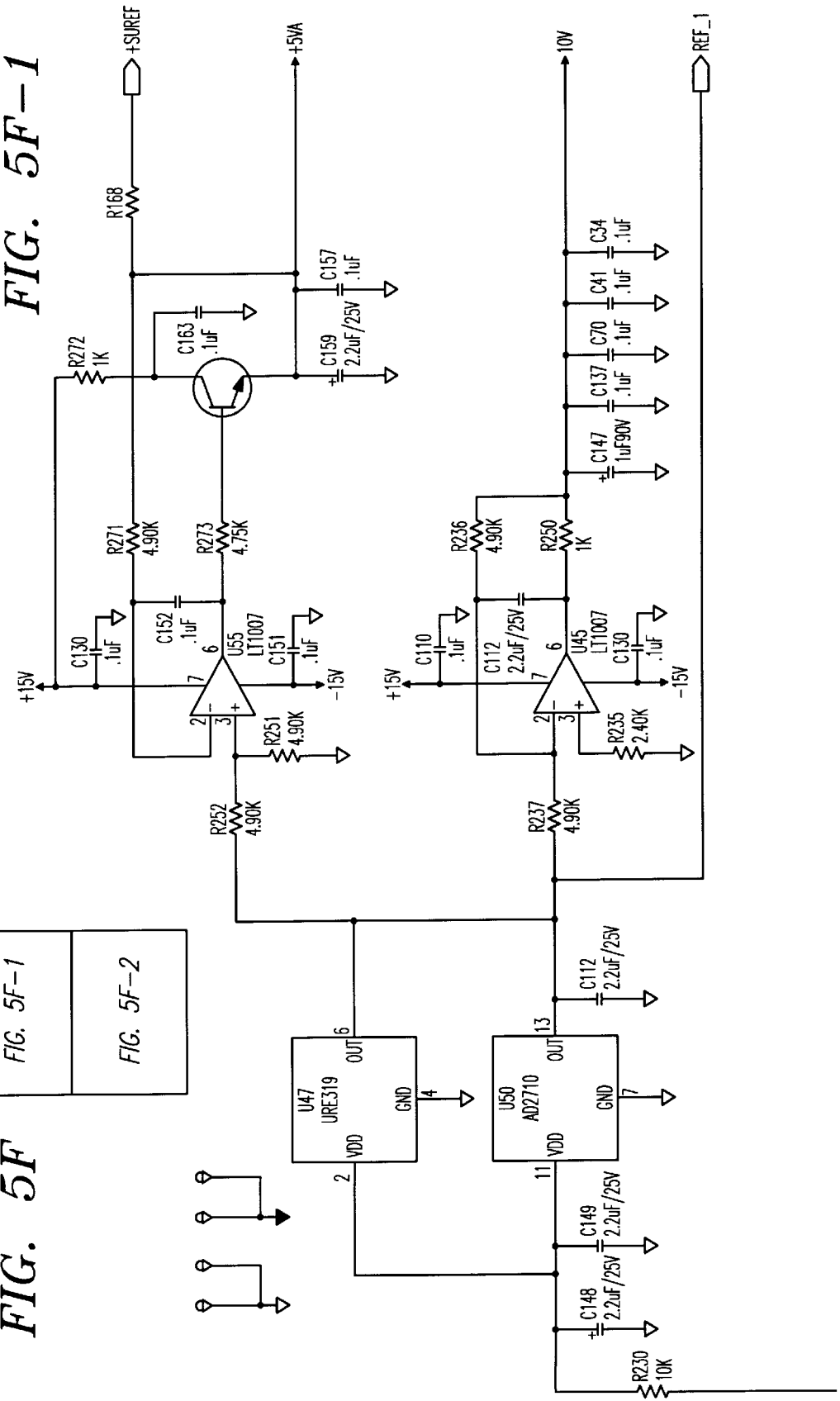

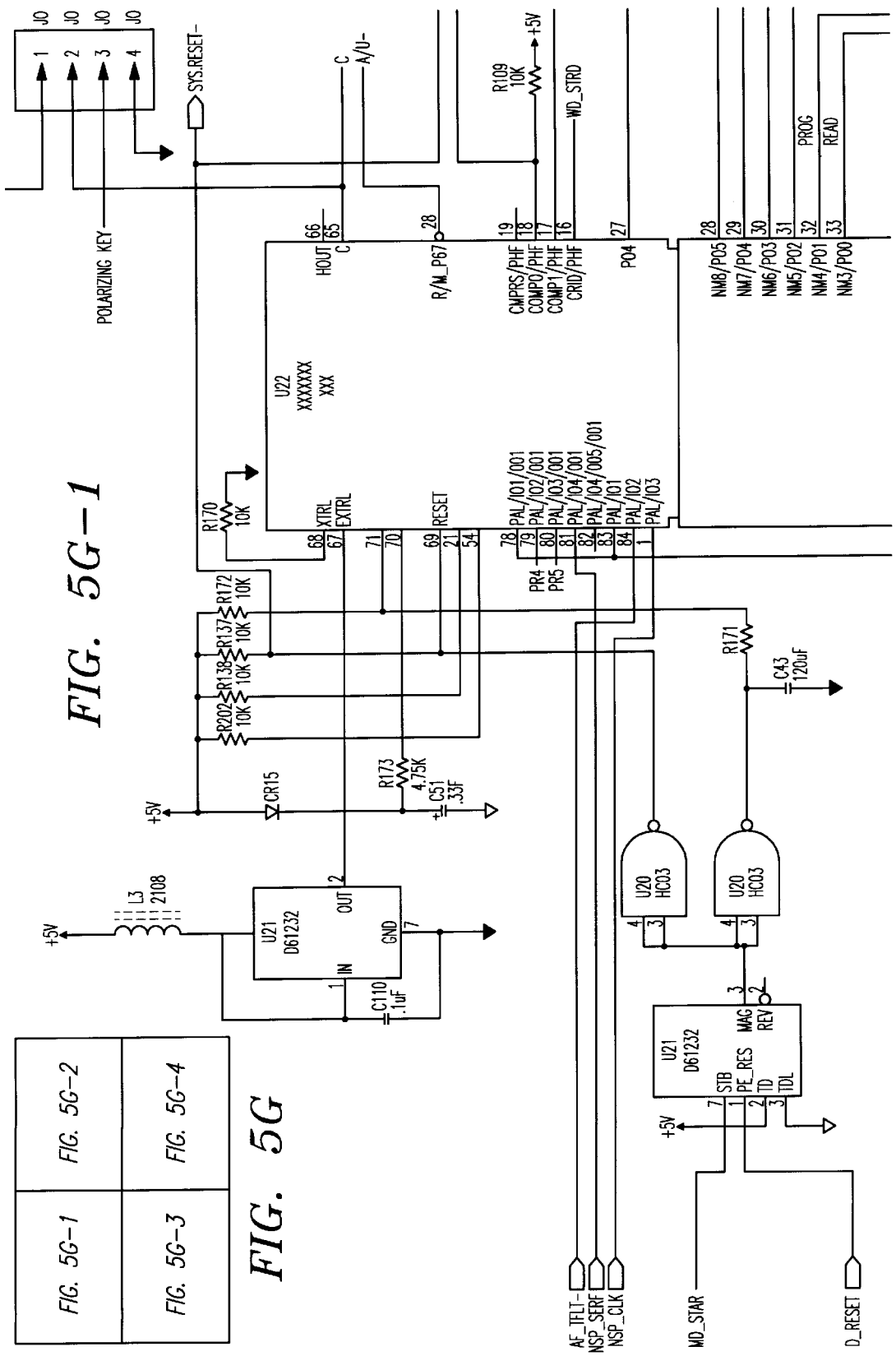

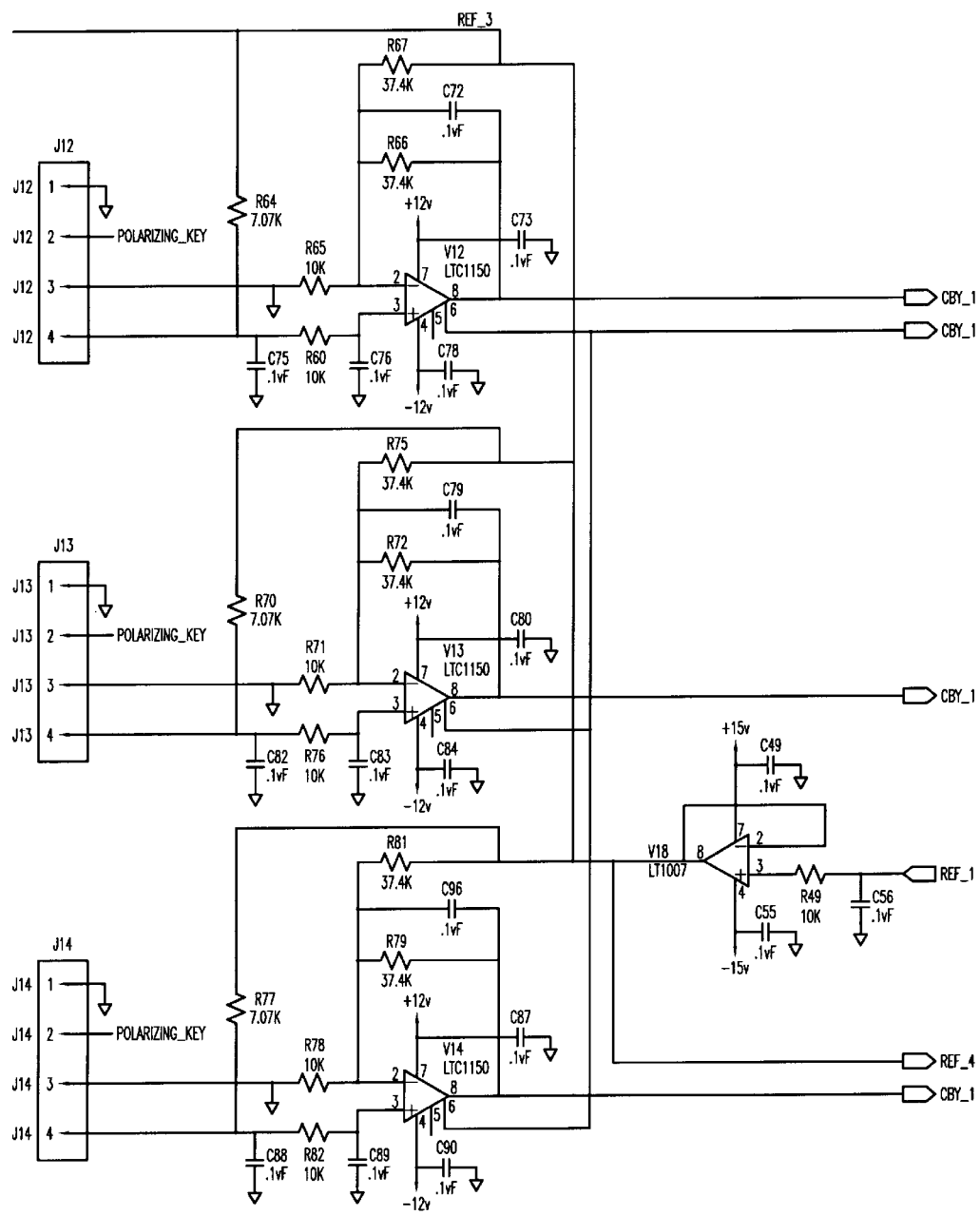
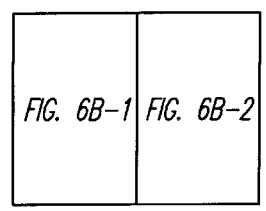
FIG. 6B-2
FIG. 6B

TEMPERATURE CONTROL OF HIGH TEMPERATURE SUPERCONDUCTING THIN FILM FILTER SUBSYSTEMS

BACKGROUND OF THE INVENTION

The field of the present invention is temperature control systems and, more particularly, systems and methods for effecting temperature control of high temperature superconducting thin film filter subsystems.

Recently, substantial attention has been devoted to the development of high temperature superconducting radio frequency (RF) filters for use in, for example, cellular telecommunications systems. However, such filters are extremely temperature sensitive. By their very nature, high temperature superconducting (HTSC) materials are temperature dependent. At temperatures above their "transition temperatures," the materials behave like an insulator, and at temperatures below the transition temperature, the materials become superconducting.

Further, when a HTSC film is fabricated into a RF filter, temperature fluctuations stemming from kinetic inductance of the filter may have a substantial effect upon the operation of the filter and, in particular, upon the center-frequency of the filter. Similarly, fluctuations in temperature may have a substantial impact upon certain non-linear behavior characteristics of HTSC thin film filters. While the non-linear behavior characteristics of a HTSC thin film filter may have a relatively mild effect upon filter operation at temperatures below the transition temperature, the same cannot be said for the kinetic inductance effect. Further, as the temperature of operation of a HTSC thin film filter approaches, for example, the transition temperature of the filter, relatively minor fluctuations in the operating temperature can have very significant effects upon filter operation. Stated somewhat differently, as HTSC thin film filter systems are operated closer and closer to their respective transition temperatures, more and more care must be taken to control the temperature of the operating environment. Thus, it will be appreciated that HTSC thin film filter systems must be maintained at stable operating temperatures if proper operation of the systems is to be maintained. This is particularly so where HTSC filters are to be operated at or near their respective transition temperatures.

Those skilled in the art also will appreciate that increased temperature stability generally is required when more "narrow-band" filters are utilized within a HTSC filter system. The reason for this is that relatively small changes in operating temperatures (e.g., +/–1° K.) may have a substantial impact upon the range of filter operation, particularly if a filter is operated at or near its transition temperature. Indeed, such changes in operating temperature may cause the center frequency of a HTSC filter to vary by as much as 100 MHz.

Now, because maximum advantage may be obtained through the use of HTSC thin film filters when the filters are operated in a narrow-band mode at approximately the transition temperature, those skilled in the art will appreciate that it is highly desirable, if not essential, to maintain very precise control of the operating temperatures of HTSC thin film filter systems.

Those skilled in the art also will appreciate that, when multiple HTSC filters are disposed, for example, within the dewar of a cryocooler, and the cryocooler is mounted, for example, on a telecommunications tower, substantial temperature control issues may arise. Simply put, a tower-mounted cryocooler will need to provide more lift (i.e., more "cold") on a hot afternoon than would be required on a cold night. Further, as the ambient temperature of the environment within which a HTSC filter system is mounted varies, temperature gradients will result between the system cold source (i.e., the cold finger of the system cryocooler) and the cold stage or location where the HTSC filters are located.

Traditionally, the above-described problems have been solved by (1) operating a HTSC filter at temperatures well below the transition temperature of the filter; (2) controlling the temperature of a HTSC filter by adding heat to a so-called cold plate with some thermal conduction to a cooler; (3) over-designing a HTSC filter system so that required temperature specifications may be met even in the presence of substantial fluctuations in, for example, ambient temperature; (4) making a cold plate or HTSC filter mount very thick so as to reduce temperature gradients across the mount; and/or (5) providing for in-situ tuning of a HTSC filter system.

Those skilled in the art will appreciate that each of the above-described options represents only a partial solution to the HTSC filter temperature control issue, and that each option has inherent disadvantages. For example, option (1) represents a tradeoff between filter temperature stability and cooler size. In short, the use of a larger cooler may provide lower "cold-finger" temperatures and increased lift, but may result in higher power consumption and system heat generation. Option (2) represents a similar tradeoff, but in that instance, the issue that must be addressed is the addition of a new heat load to the system. Finally, those skilled in the art will appreciate that options (3) and (5), while potentially effective, are subject not only to economic limits, but also to performance limits.

In view of the foregoing, it is believed that those of ordinary skill in the art would find an improved temperature control system for use with HTSC thin film filter systems to be quite useful.

SUMMARY OF THE INVENTION

The present invention is directed to an improved temperature control system for HTSC thin film filter systems and to related temperature control methodologies.

In one particularly innovative aspect, the present invention is directed to the use of a multi-stage temperature controller within a HTSC thin film filter system. In one presently preferred embodiment, the multi-stage temperature controller comprises a first temperature control loop, or "inner loop," and a second temperature control loop, or "outer loop." The inner loop monitors a cold finger temperature of a cryocooler and provides for efficient and stable control of the cryocooler in response to an internal reference signal or voltage. The outer loop monitors a cold stage temperature (i.e., a temperature within the general vicinity of a HTSC filter), and provides (as an output) the internal reference voltage to the inner loop. Thus, it will be appreciated that a temperature control system in accordance with the present invention has the ability to quickly and efficiently respond to temperature gradients that may exist between a cold stage of a filter system and, for example, the cold finger of an associated cryocooler. As explained above, such gradients may result, for example, from temporal, seasonal and/or weather-induced changes in ambient temperature, and it is quite important that a tower-mounted HTSC filter system have the ability to accommodate such ambient temperature changes.

It also will be appreciated that, by using a multi-staged control system in accordance with the present invention, it is possible to precisely monitor the temperature within the immediate vicinity of one or more HTSC filters or filter stages without sacrificing the stability of any relevant control loop. This, it is believed, represents a significant improvement over conventional HTSC filter temperature control systems.

In other preferred embodiments, a temperature control system in accordance with the present invention may further include a filter loop of the type described in co-pending U.S. patent application Ser. No. 08/369,004, now U.S. Pat. No. 5,818,097 which is entitled "Temperature Controlling Cryogenic Package System" and is incorporated herein by reference. The filter loop may be used to control the current provided to one or more resistors located within the immediate vicinity of the HTSC filters and, therefore, to fine tune the temperatures of the various filters within a system. Such a loop also may be used to adjust with substantial accuracy the center frequency of the filters.

Finally, in still further embodiments, a plurality of HTSC thin film filter package assemblies may be mounted to an innovative, symmetrically shaped heat-sink in accordance with the present invention. The use of such a heat-sink allows for the use of a single pair of sensors (e.g., a cold finger temperature sensor and a cold stage temperature sensor) to be used to control with fairly high precision the operating temperatures of several HTSC filter package assemblies. The use of such a heat-sink also allows a temperature sensor provided, for example, on one cold stage to predict with a fairly high degree of accuracy the temperature of another cold stage within a HTSC filter system.

Accordingly, it is an object of the present invention to provide an improved temperature control system for use with, for example, HTSC thin film filters, and to provide improved methods for regulating the temperatures of such filters.

Other objects and features of the present invention will become apparent from consideration of the following description taken in conjunction with the accompanying drawings.

DETAILED DESCRIPTION OF PREFERRED EMBODIMENTS

Figure 1:
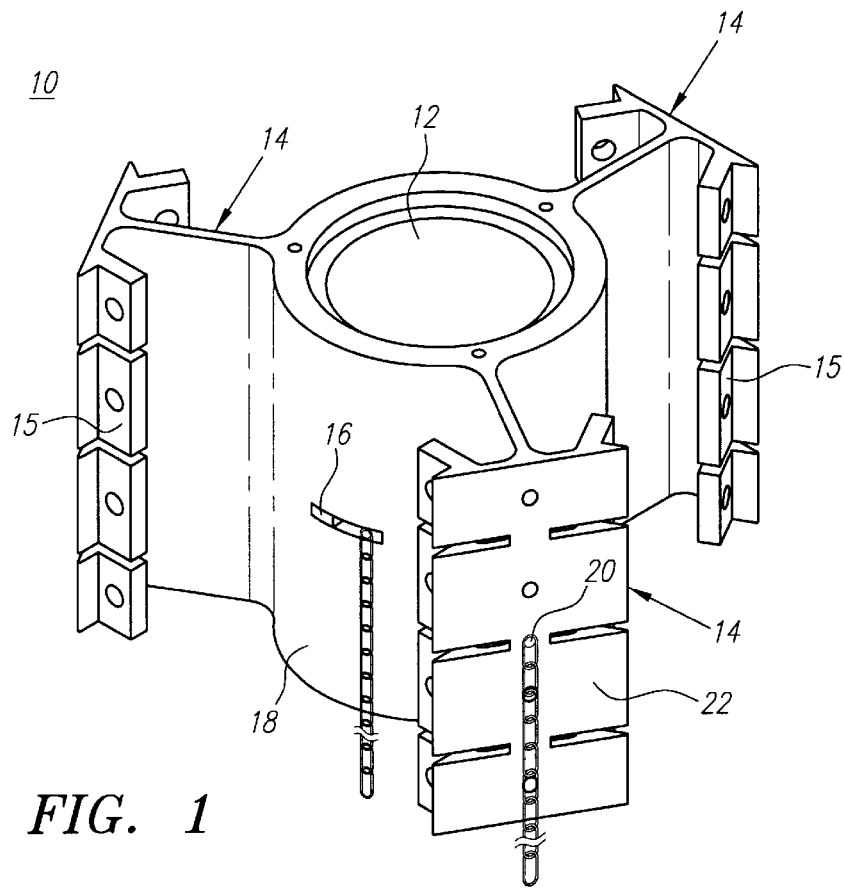
FIG. 1 is an isometric view of a heat-sink for use with a cryocooler in a temperature control system in accordance with the present invention.

Turning now to the drawings, FIG. 1 provides an illustration of a heat-sink 10 that may support a plurality of HTSC thin film filter substrates (not shown) in accordance with the present invention. The heat-sink 10 is generally symmetric in shape and has central cavity 12 for mating with a cold finger (not shown) of, for example, a Stirling cycle cryocooler. In addition, the heat-sink 10 has a plurality of T-shaped radially extending extremities 14 that provide mounts for a corresponding number of HTSC filter assembly carrier packages (not shown). It will be noted that a cold finger temperature sensor 16 may be affixed to a main body portion 18 of the heat-sink 10, and that one or more cold stage temperature sensor(s) 20 may be affixed to a central portion of an external surface 22 of the T-shaped extremities 14. Thus, it will be appreciated that the cold finger temperature sensor 16 may be used to monitor with fairly close approximation a temperature of a cold finger (not shown) of an associated cryocooler, and the cold stage temperature sensor(s) 20 may be used to monitor with fairly close approximation the temperatures of any HTSC filter assembly carrier packages (not shown) that are mounted to the heat-sink 10. A cryocooler of the type that might be used in accordance with the present invention is described in co-pending U.S. patent application Ser. No. 09/175,924, which is entitled "Cryocooler Motor with Split Return Iron" and is hereby incorporated by reference.

Figure 2:
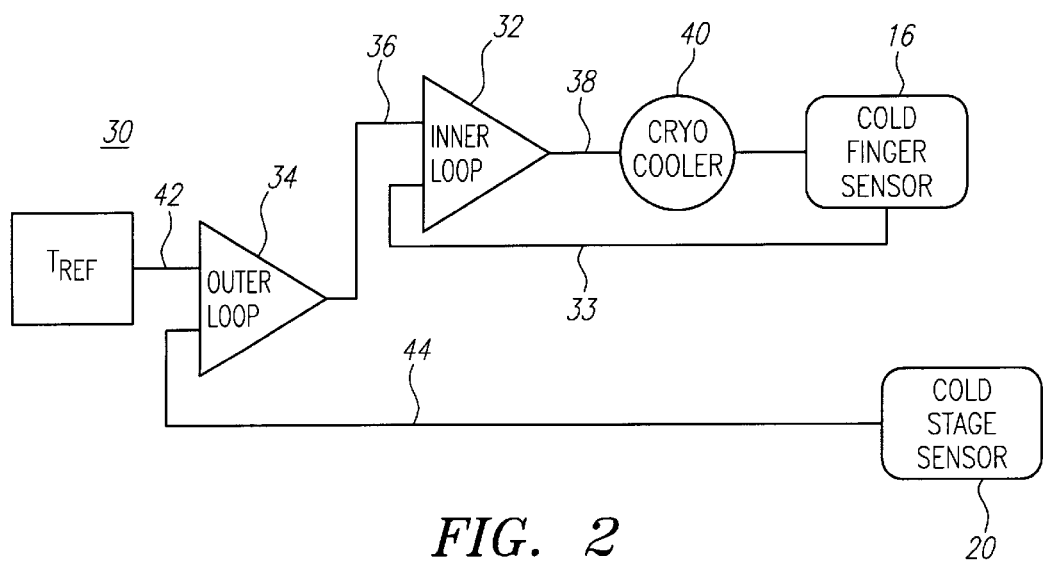
FIG. 2 is a block diagram illustrating the components of a multi-stage temperature controller in accordance with one form of the present invention.

Now, turning to FIGS. 2, in one presently preferred form, a temperature controller 30 for a HTSC thin film filter system including, for example, a Stirling cycle cryocooler 40 may comprise a multi-staged system including an inner loop controller 32 and an outer loop controller 34. The inner loop controller 32 receives, as a first input, an output signal 33 from the cold finger temperature sensor 16. As a second input, the inner loop controller 32 receives a signal comprising the output 36 of the outer loop controller 34. Thus, it will be appreciated that the output 36 of the outer loop controller 34 may be viewed as a reference signal to which the signal 33 from the cold finger temperature sensor 16 is compared. The output 38 of the inner loop controller 32 is used to control the amount of power that is provided to the Stirling cycle cryocooler 40. Accordingly, it will be appreciated that an inner loop of a control system in accordance with the present invention may comprise a fairly fast, simple and stable loop for controlling to a first order the temperature of the cold finger (not shown) of the cryocooler 40, and that the cold finger temperature of the cryocooler 40 may be dictated by the output 36 of the outer loop controller 34.

In contrast, the outer loop controller 34 has, as a first input, a reference signal 42 and, as a second input, an output signal 44 received from the cold stage temperature sensor 20. Thus, the signal 44 received from the cold stage temperature sensor 20 may be compared to the reference signal 42 by the outer loop controller 34, and the outer loop controller 34, in turn, may be used to drive, or set the reference temperature for, the inner loop of the control system. In this fashion, temperature gradients within the heat-sink 10, that may result, for example, from temporal, seasonal or weather-induced changes in ambient temperature, may be easily accommodated by the control system 30.

Figure 3:
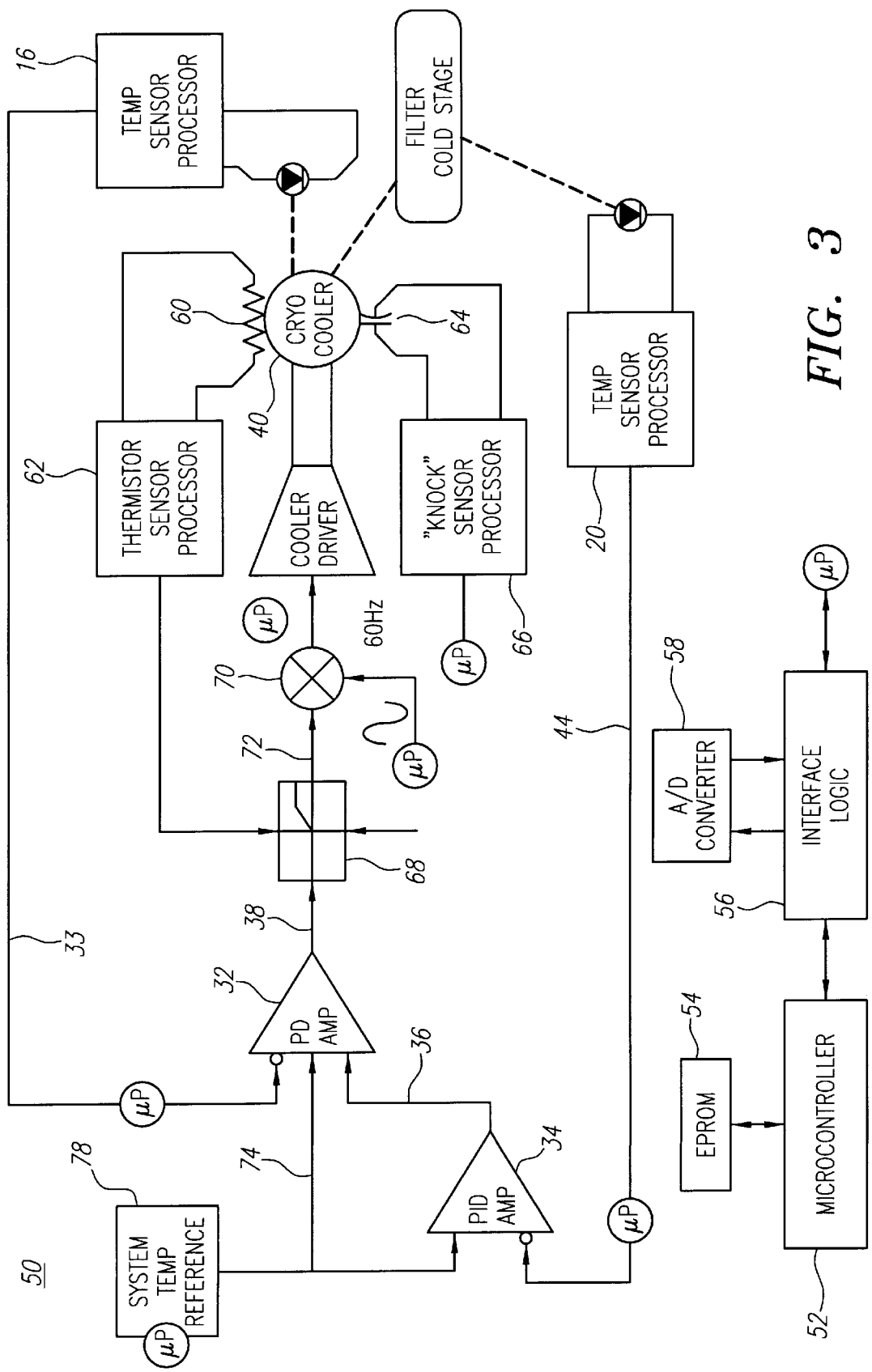
FIG. 3 is a block diagram illustrating the components of a multi-stage temperature controller in accordance with a preferred form of the present invention.

Turning now to FIG. 3, in a particularly preferred form, a temperature control system 50 in accordance with the present invention is microprocessor based. Moreover, a microcontroller 52 and related EPROM 54, interface logic 56, and analog-to-digital (A/D) converter 58 are utilized to monitor selected points μp within the control system 50. Those skilled in the art will appreciate that the temperature control system 50 may be implemented using either analog or digital circuits and, therefore, that the specific circuitry utilized to implement the control system 50 is not described in detail herein. Rather, the basic functionality of the control system 50 is described herein, and to the extent that specific details regarding the implementation of the control system 50 may be useful to those skilled in the art, detailed circuit schematics of a multi-staged control system in accordance with the present invention are submitted herewith as FIGS. 5(A)–(H) and 6(A)–(C).

Like the basic system 30 illustrated within FIG. 2, the control system 50 preferably includes an inner control loop and an outer control loop. However, in the case of the control system 50, the inner loop is somewhat more refined. For example, the inner loop of the control system 50 may comprise, in addition to the inner loop controller 32 and cold finger temperature sensor 16, a thermistor sensor 60 and related processor 62, a knock sensor 64 and related processor 66, a limiter circuit 68, and a multiplier circuit 70. Further, it will be appreciated that, while the inner loop controller 32 may comprise any type of proportional controller, it is presently preferred that the inner loop controller comprise a proportional and derivative (PD) controller.

The knock sensor 64 may comprise, for example, a PZT crystal based sensor (or microphone), a back EMF sensor circuit or current analyzer circuit that may be used to detect overstrokes of the cryocooler 40. Moreover, it will be appreciated that more power may be provided to a Stirling cycle cryocooler as the temperature of the cold finger (not shown) of the cryocooler decreases. Stated somewhat differently, when a Stirling cycle cryocooler initially is turned "on" only a limited amount of power may be provided to the cryocooler to drive the cryocooler. However, as the temperature of the cold finger (not shown) of the cryocooler begins to drop, additional power may be provided to the cryocooler. Thus, the knock sensor 66, when used in conjunction with the limiter circuit 68, functions to ensure that the cryocooler 40 is not overdriven, for example, at start-up.

Like the knock sensor 66, the thermistor sensor 60 and limiter circuit 68 also function to ensure that the cryocooler 40 is not overdriven. However, the thermistor sensor 60 is used to monitor the temperature of the cryocooler 40 and to limit the power that is provided to the cryocooler 40 when, for example, the cryocooler 40 becomes too hot.

The multiplier circuit 70 preferably is responsive to the output signal 72 of the limiter circuit 68 and amplitude modulates a 60 Hz signal that is used to drive the cryocooler 40.

Finally, it will be appreciated that the inner loop controller 32 receives as inputs the output 36 of the outer loop controller 34, a reference signal 74, and a signal comprising the output 33 of the cold finger temperature sensor 16. However, the output 38 of the inner loop controller 32 preferably is primarily derived from the output 36 of the outer loop controller 34.

Thus, it will be seen that the output of the inner loop controller 32, as modified by the limiter circuit 68 and provided to the multiplier circuit 70, may be used to drive, for example, a Stirling cycle cryocooler 40 causing the cryocooler 40 to provide variable lift (i.e., a varying source of "cold"). It will further be appreciated that the inner loop provides a comparatively fast, simple and stable loop that drives the cold finger temperature of a cryocooler 40 to a temperature dictated by the outer loop controller 34.

Turning now to the function of the outer loop controller 34, that controller preferably comprises a proportional integral derivative (PID) controller, and has as its inputs the reference signal 74 and a signal comprising the output 44 of the cold stage temperature sensor 20. The outer loop controller 34 strives to provide "zero error" between the cold stage sensor output signal 44 and the reference signal 74. The reference signal 74 preferably is set by a precision voltage source 78 that is adjustable via software and is used to determine the ultimate cold stage operating temperature. As mentioned above, a portion of the reference signal 74 is provided as an input to the inner loop controller 32 in an effort to improve a dynamic range of the control system 50 independent of the outer loop set point.

It will be appreciated that, through the use of a dual control loop configuration in accordance with the present invention, it is possible to provide a control system that is stable, comparatively quick, and quite accurate over a wide variety of operating conditions. Further, because of the relative speed of the inner loop, the inner loop preferably tends to move the "dominant pole" of the control system 50 to a higher frequency. This, in turn, allows for thermal accuracy purposes optimization of the placement of the cold stage temperature sensor 20, and also provides for improved dynamic stability of the control system 50.

The configuration of the heat-sink 10 also enhances system function and, if desired, may allow for a single cold stage temperature sensor 20 to be utilized to monitor within a very close approximation the temperatures of multiple HTSC filter assembly carrier packages.

As has been explained to some extent above, one principal advantage that is achieved through the use of a control system 50 in accordance with the present invention is that the control system 50 has the ability to respond to temperature gradients that may exist between the cold finger and cold stages of a HTSC filter system enclosure. Moreover, the utilization of a temperature control system 50 in accordance with the present invention makes it possible to achieve thermal stability of a large thermal mass, while at the same time maintaining dynamic stability of the control system and using comparatively inexpensive parts.

Figure 4:
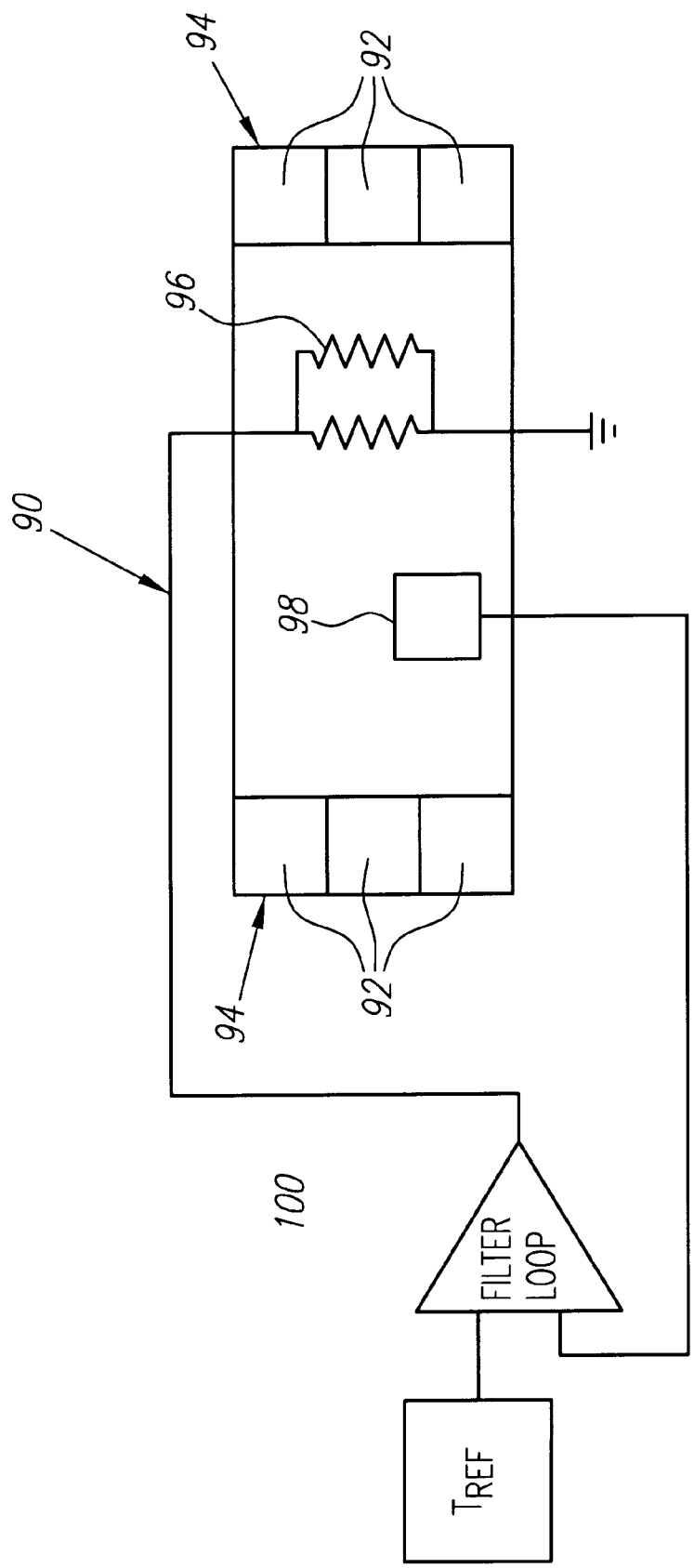
FIG. 4 is an illustration of a HTSC filter carrier package that may be used in accordance with the present invention.
Figure 5A:
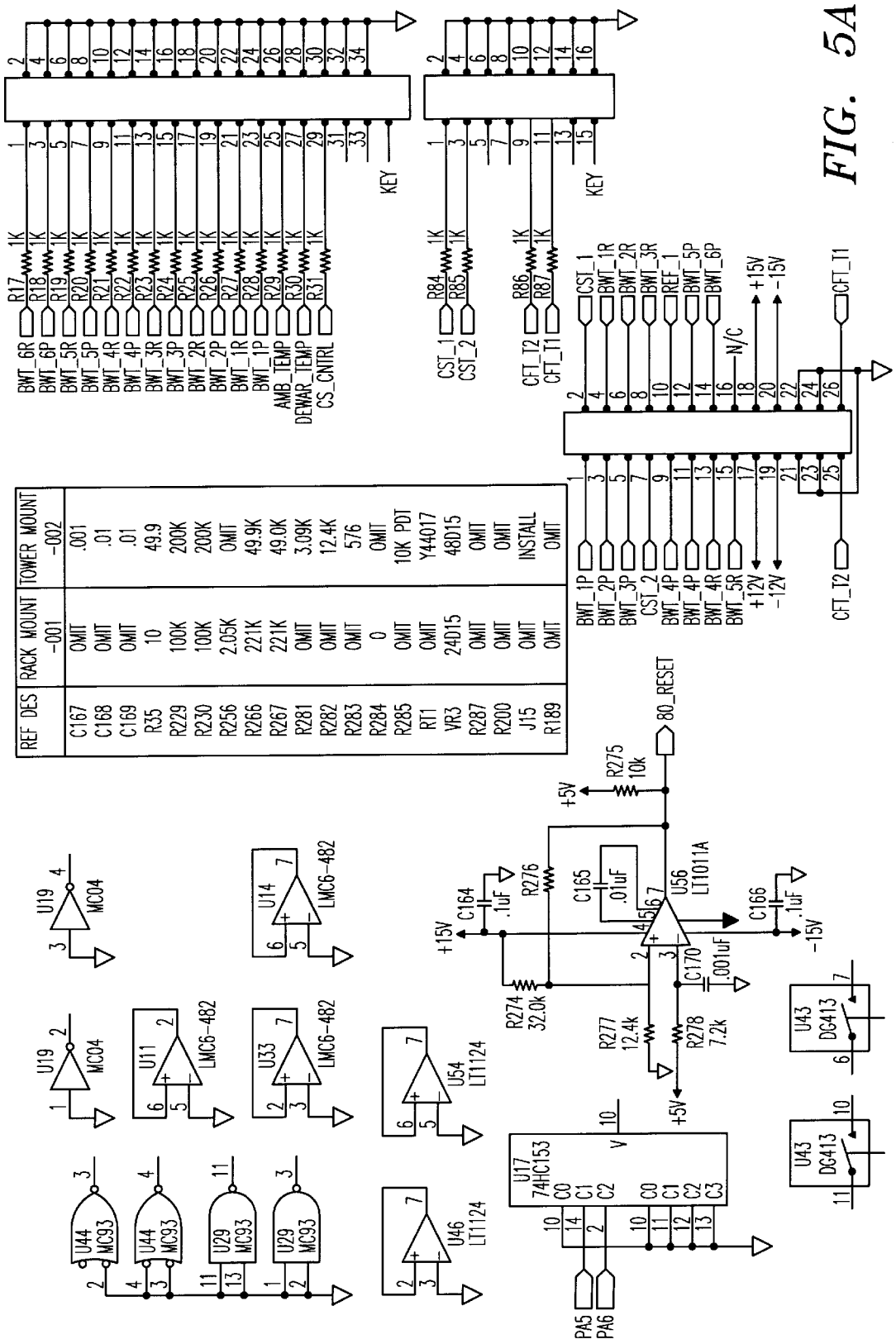
FIGS. 5(A)–(H) and 6(A)–(C) comprise circuit schematics for a mother board and daughter board, respectively, of a temperature controller in accordance with a preferred form of the present invention.
Figure 5B:
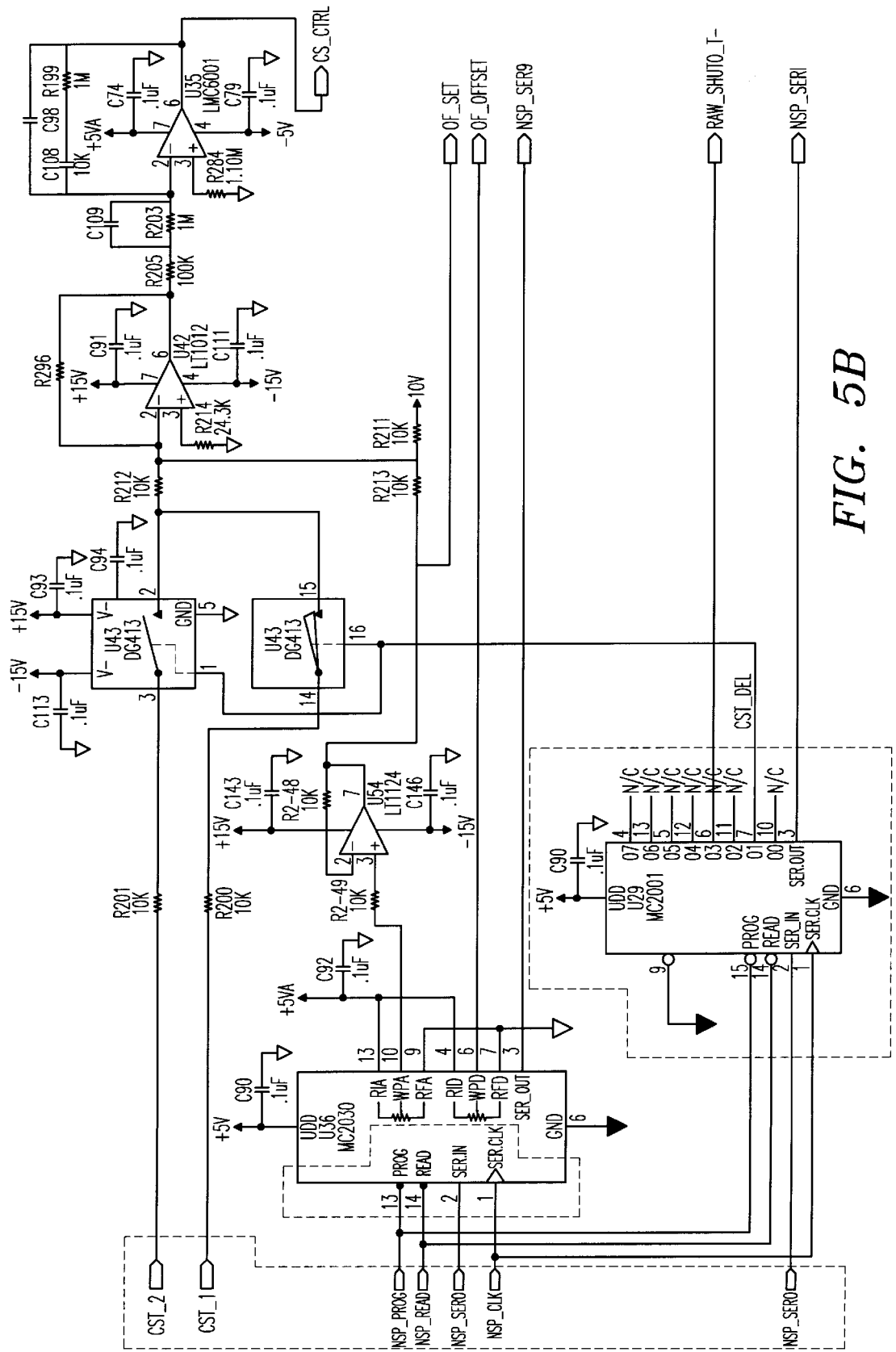
Figures 1, 5C:
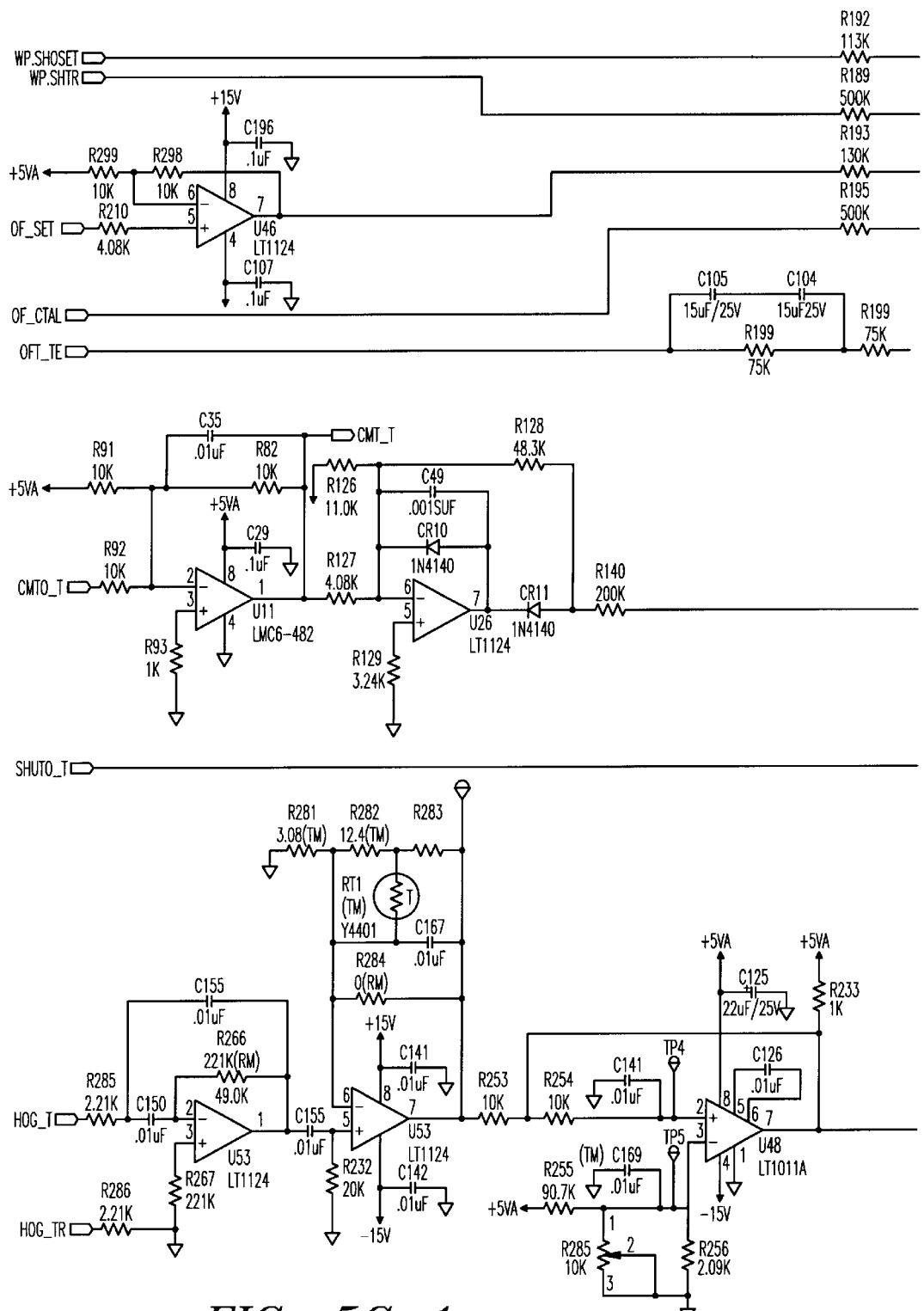
Figures 2, 5C:
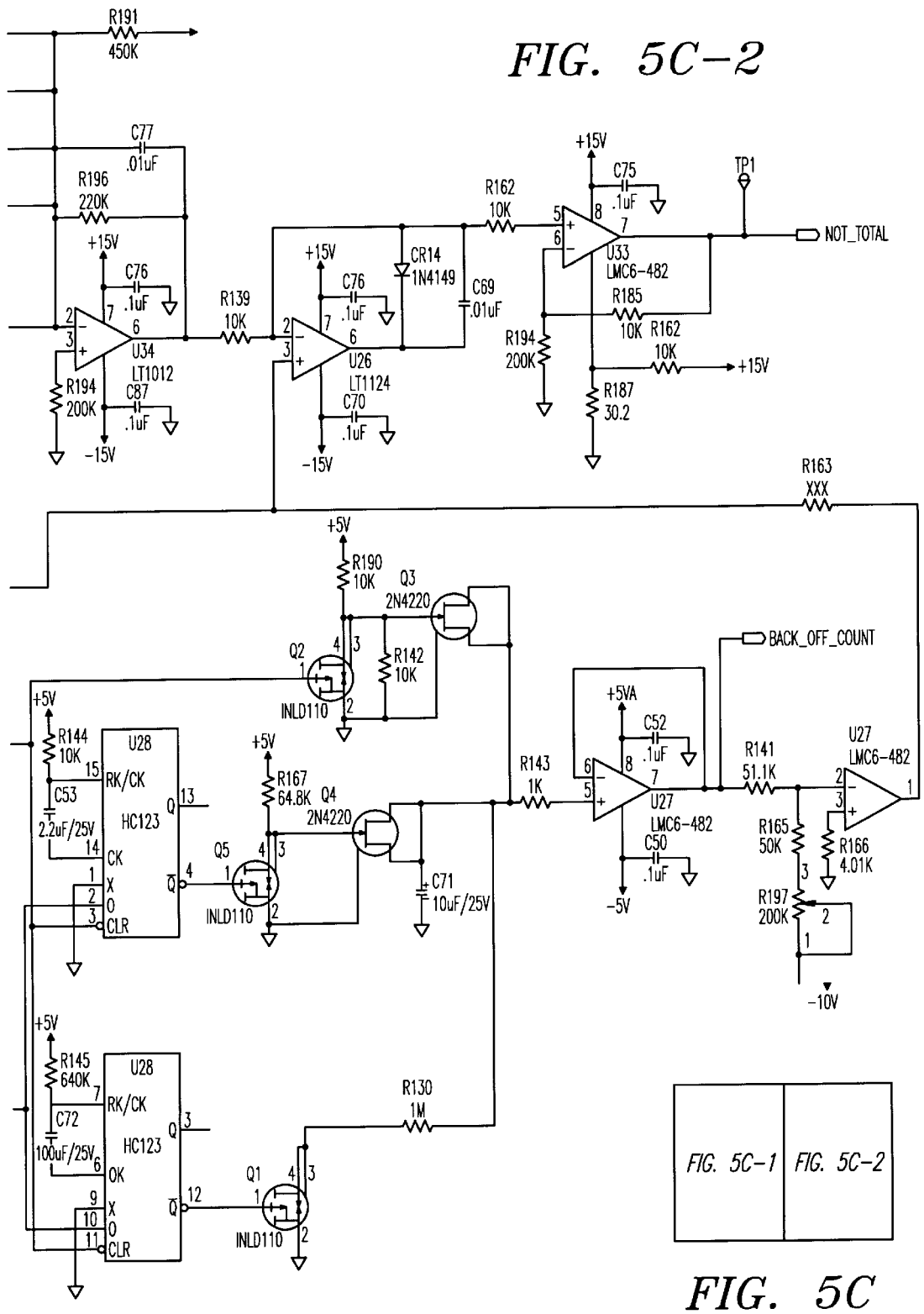
Figures 1, 5D:
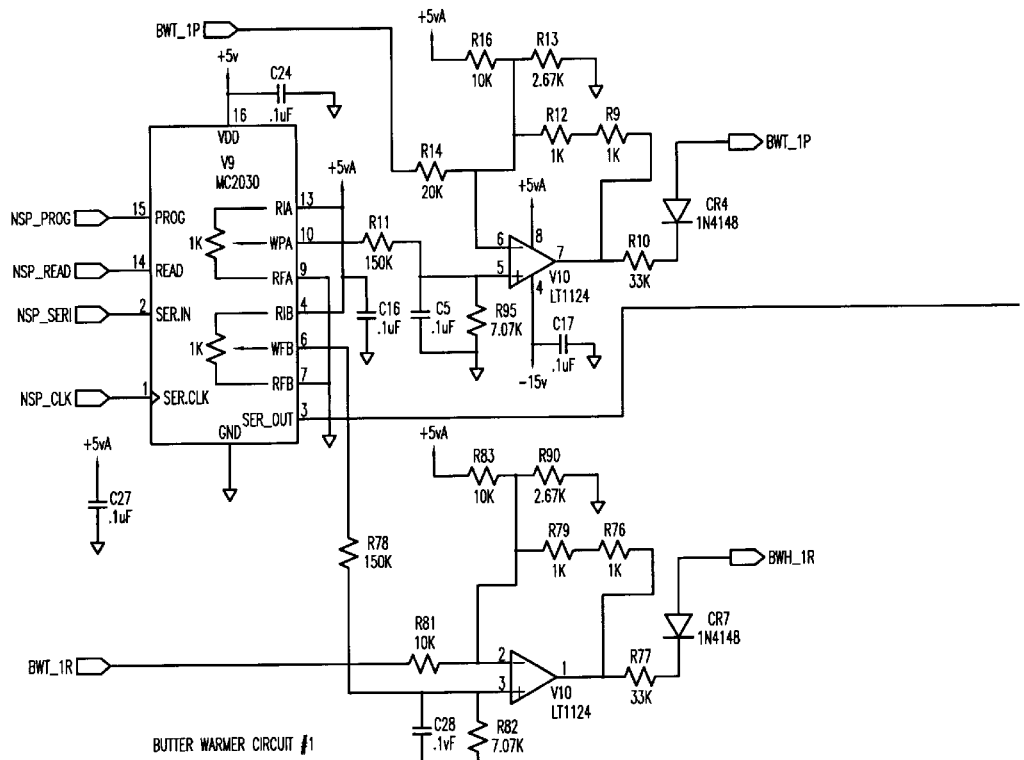
Figure 5D:
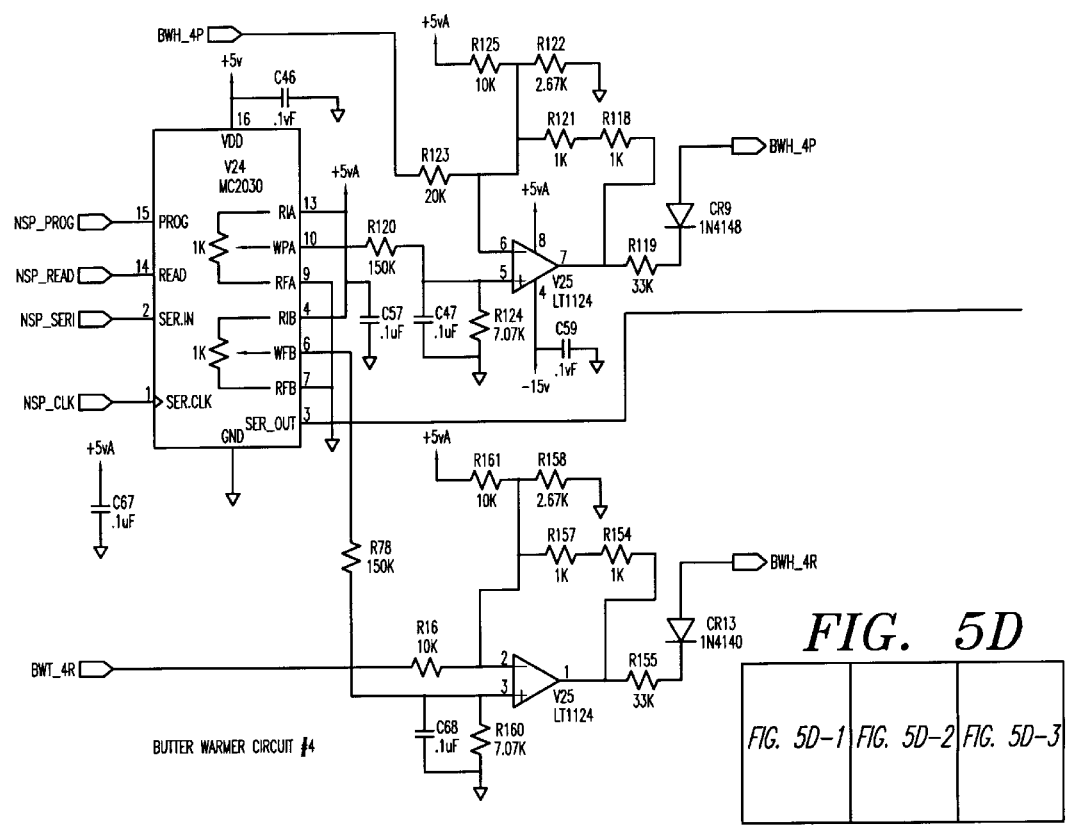
Figures 2, 5D:
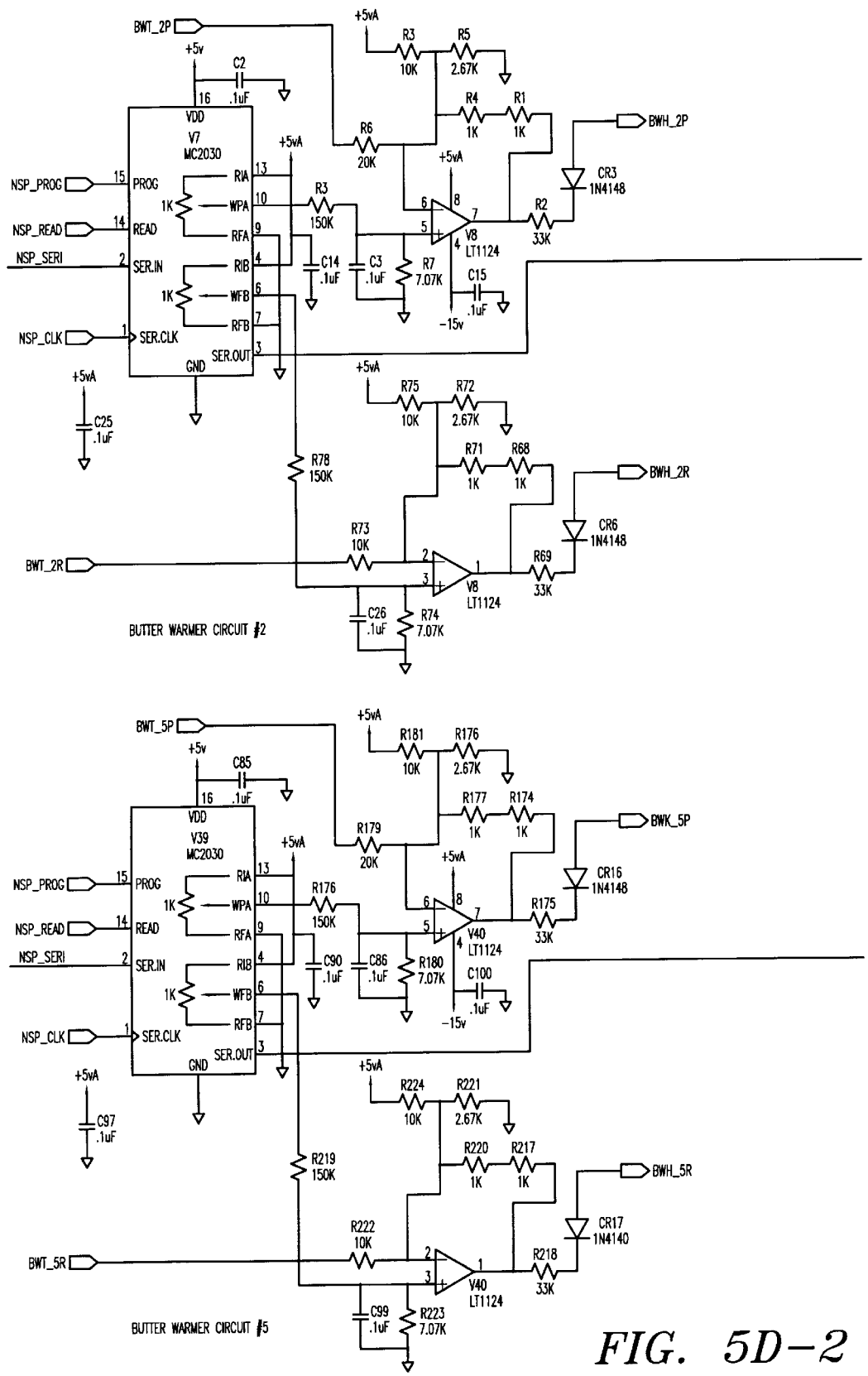
Figure 5D:
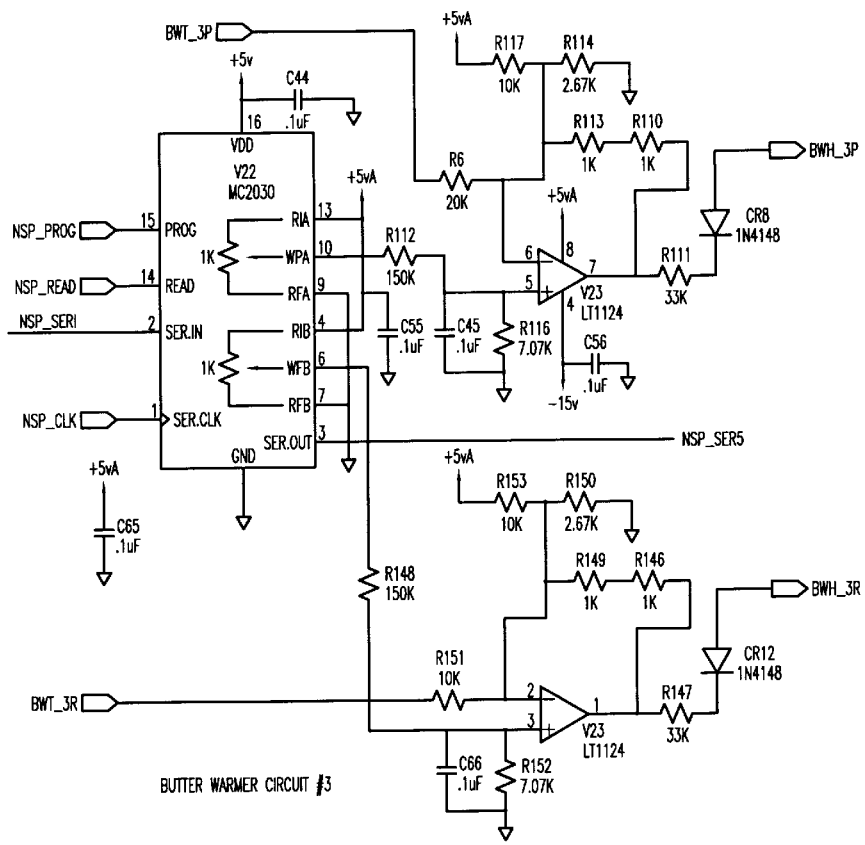
Figure 3:
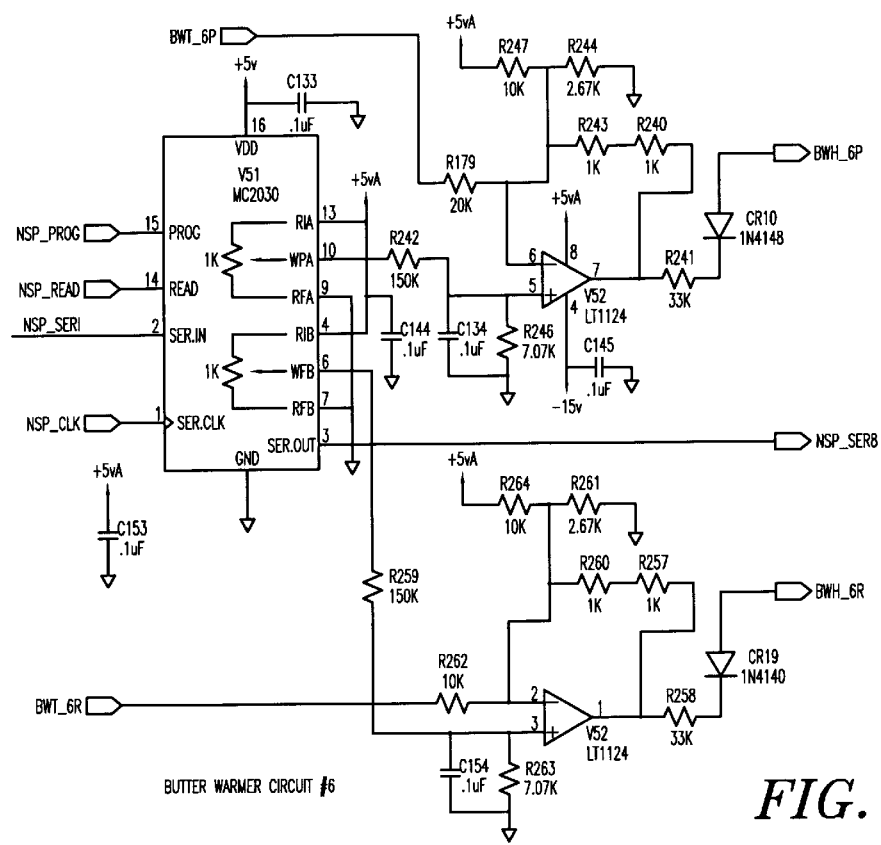
Figure 5E:
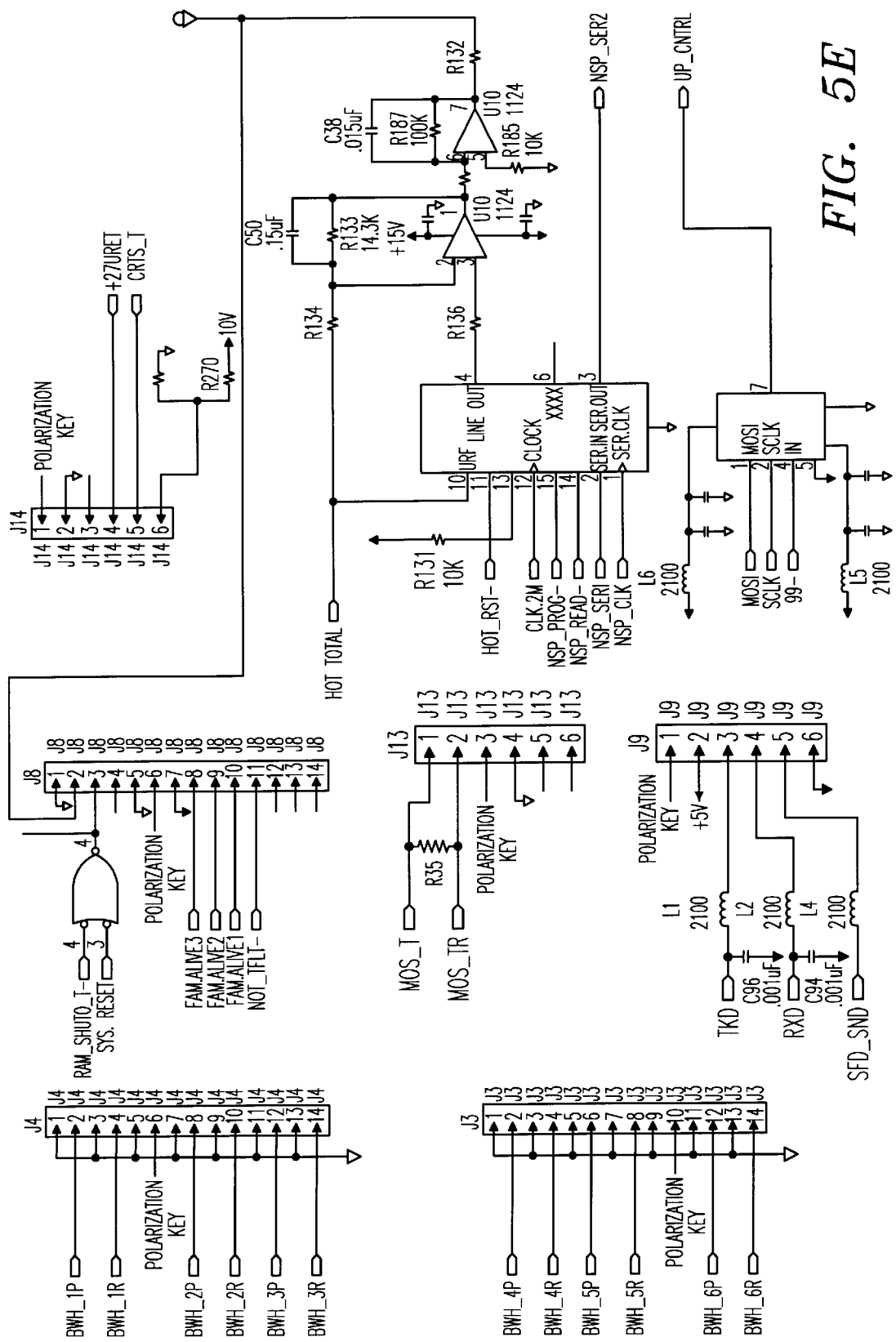
Figures 2, 5F:
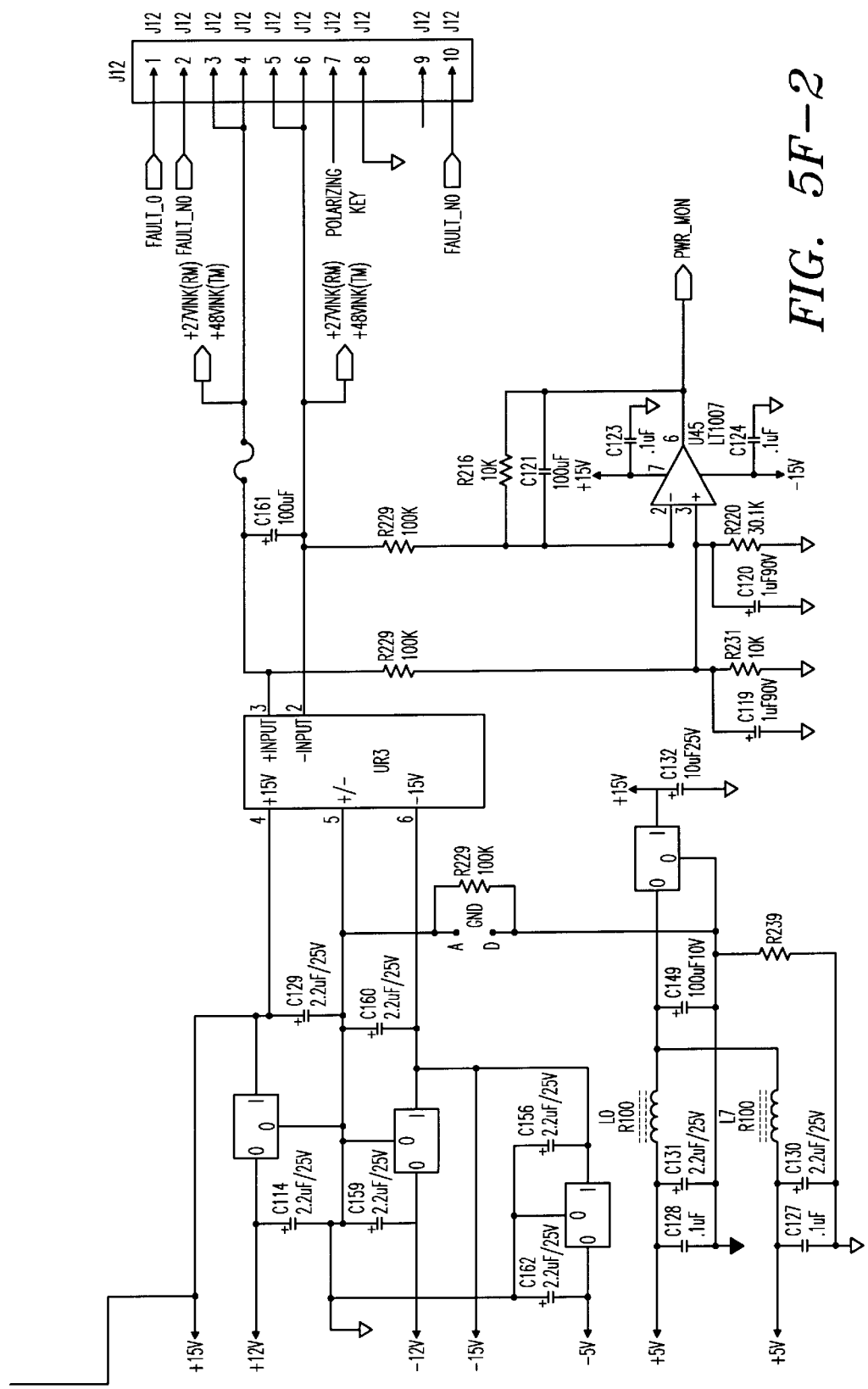
Figures 2, 5G:
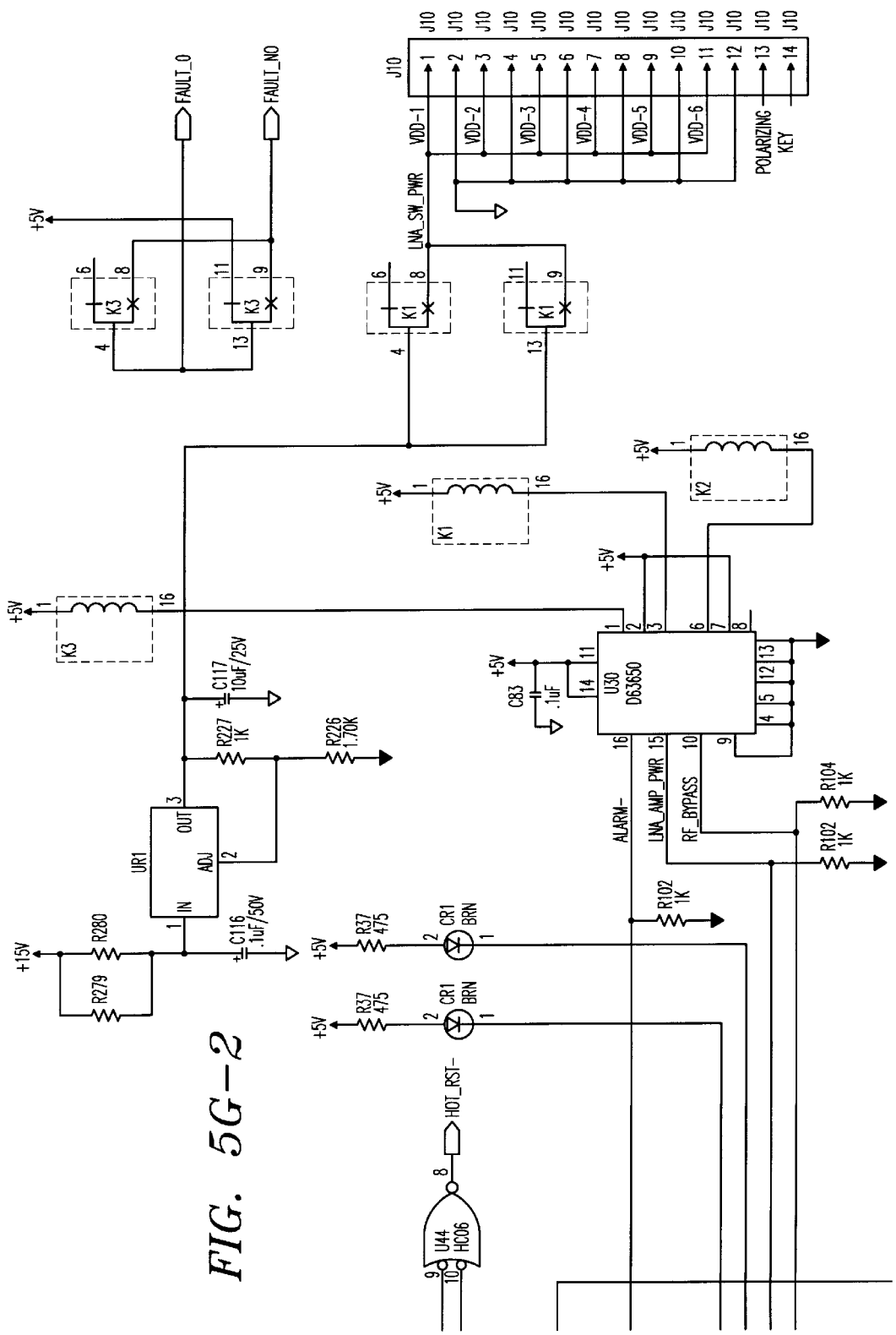
Figures 3, 5G:
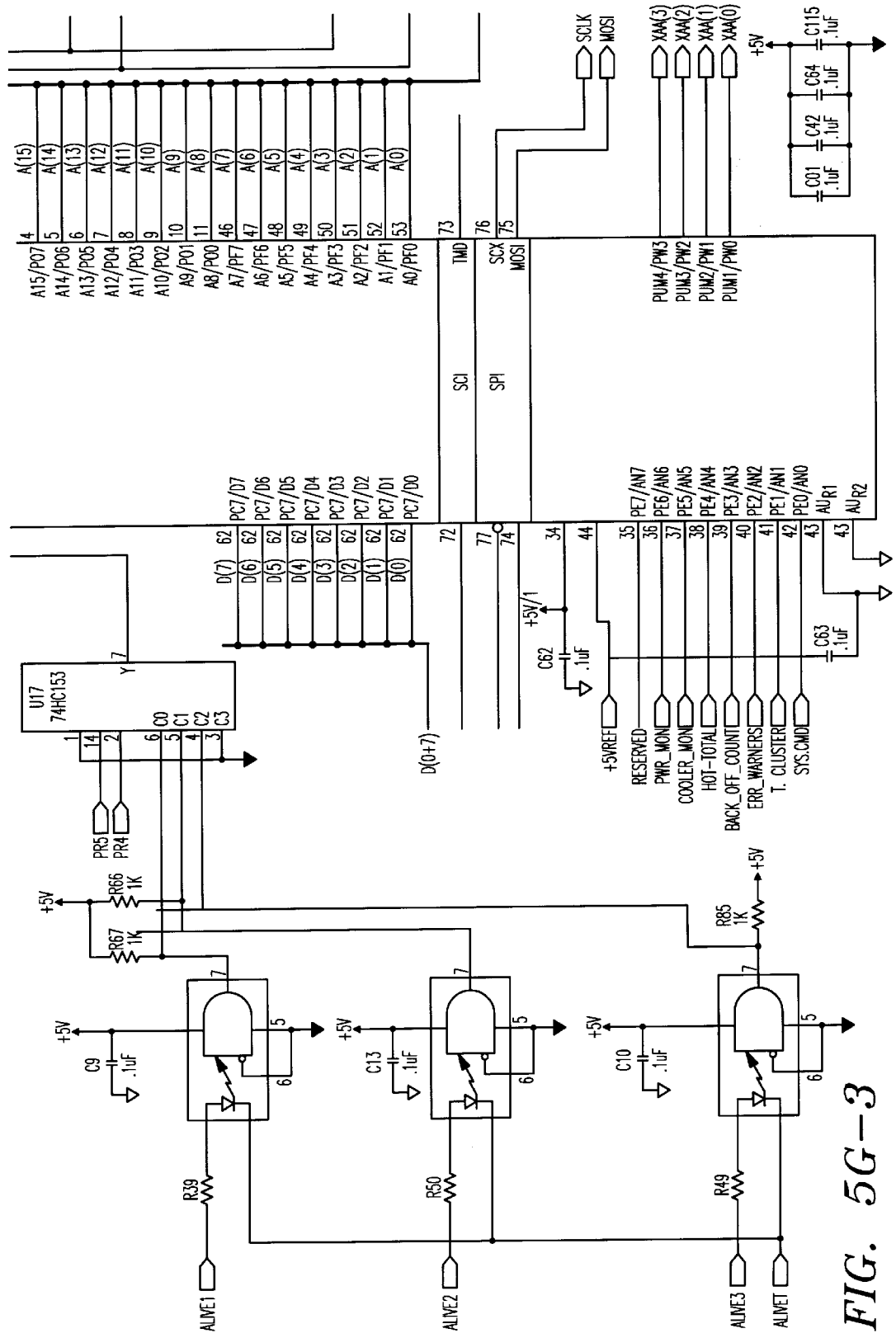
Figures 4, 5G:
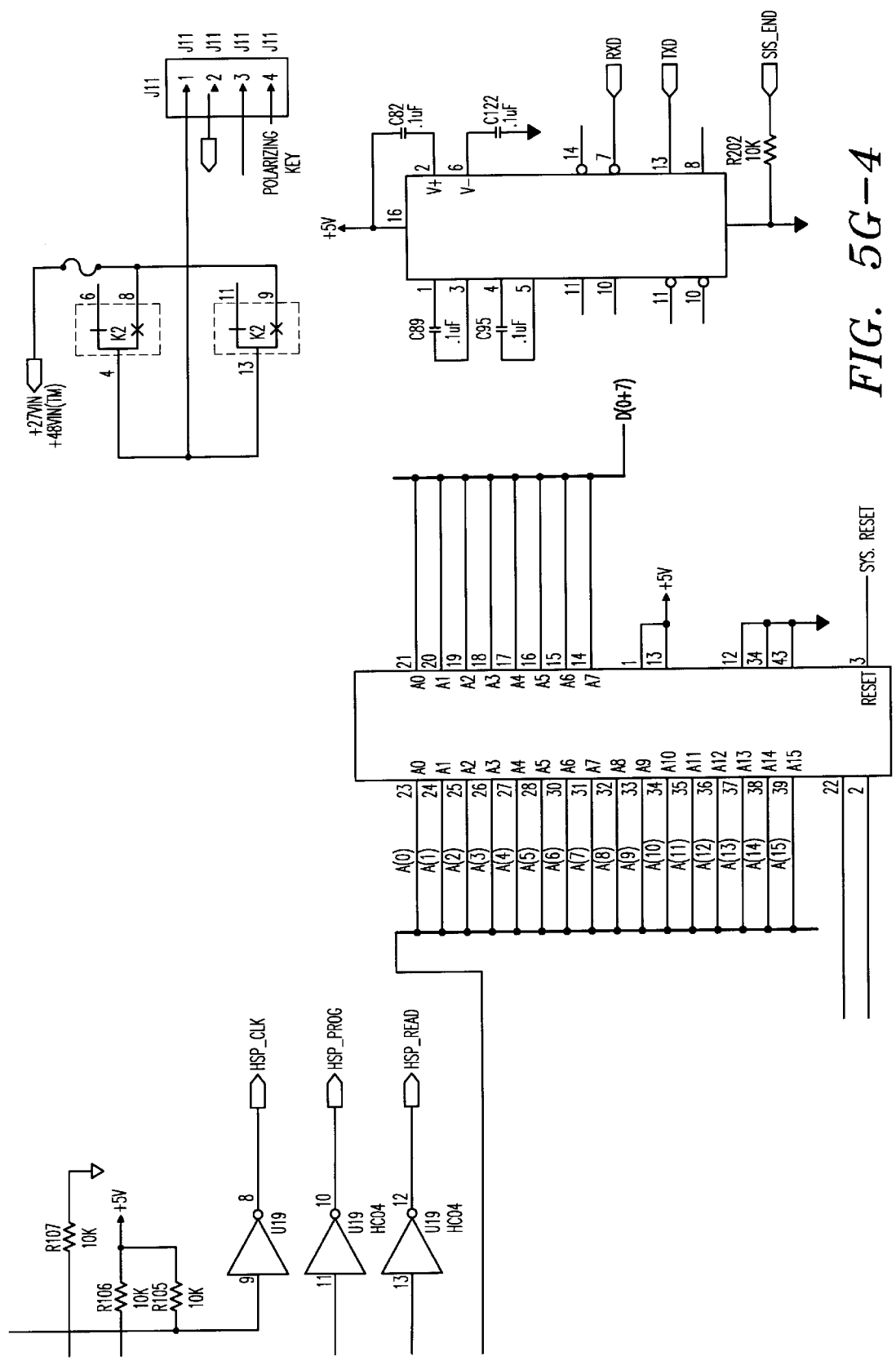
Figures 1, 5H:
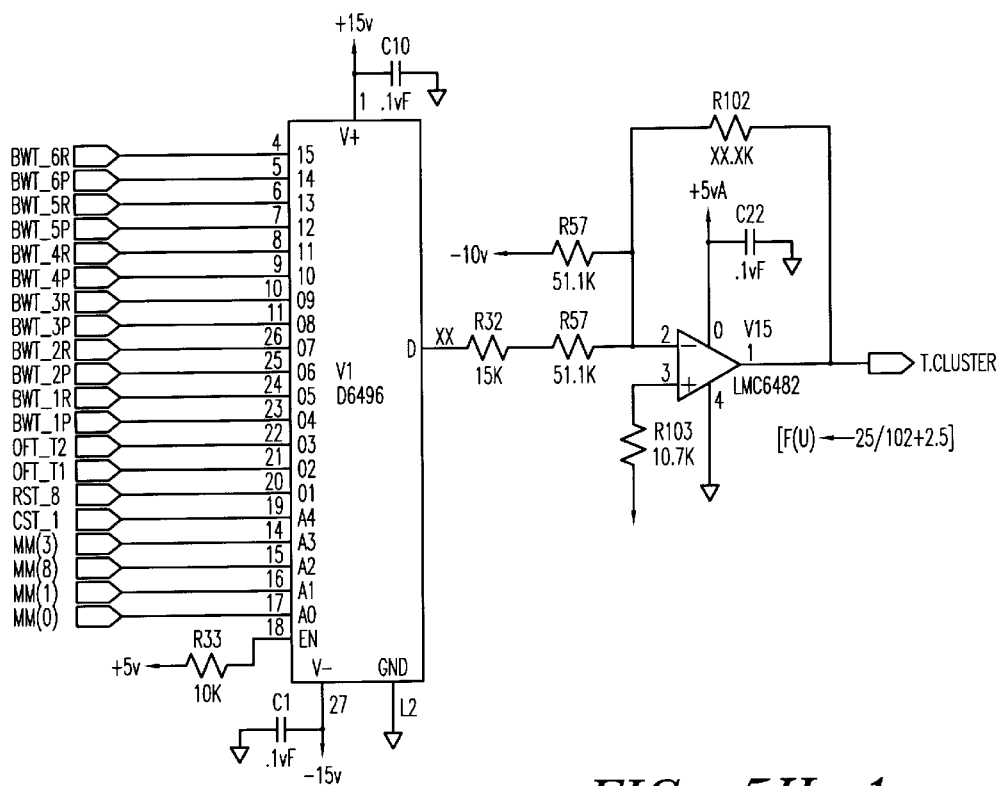
Figure 5H:
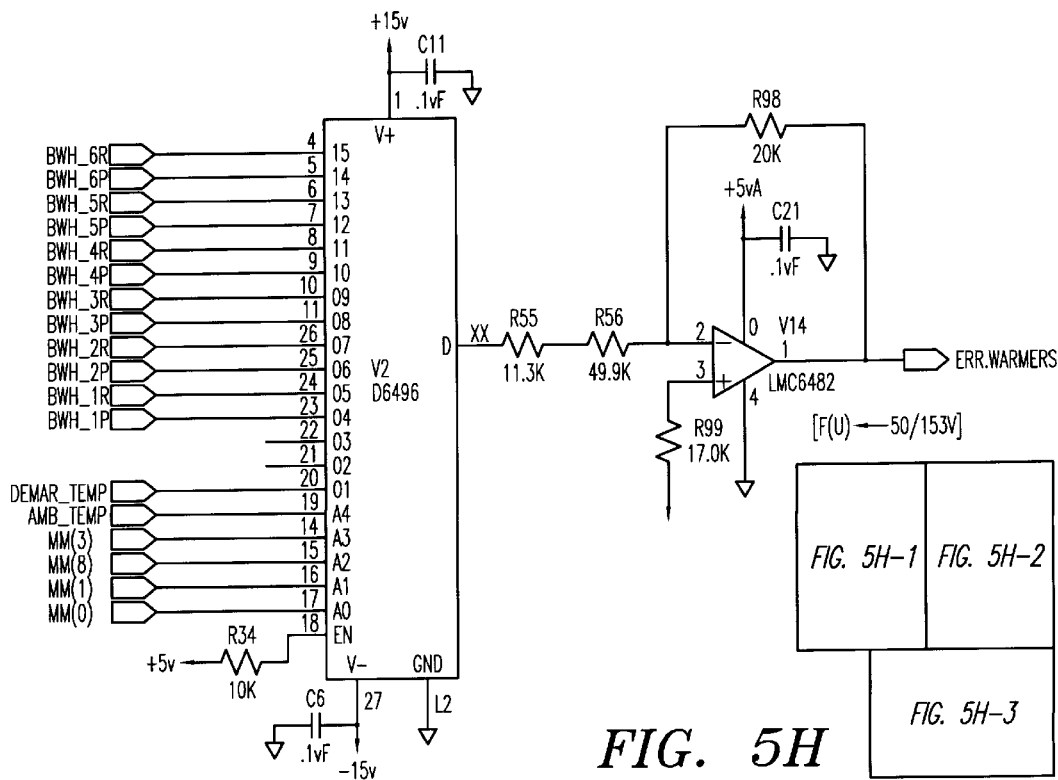
Figure 5H:
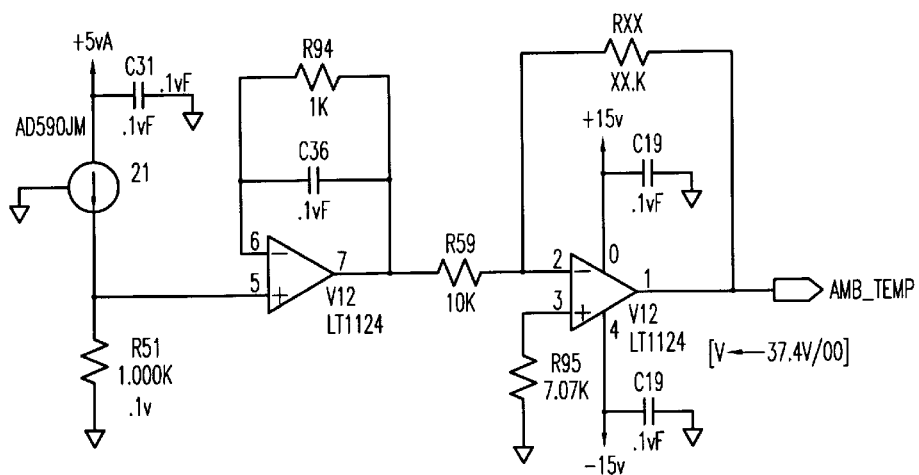
Figure 2:
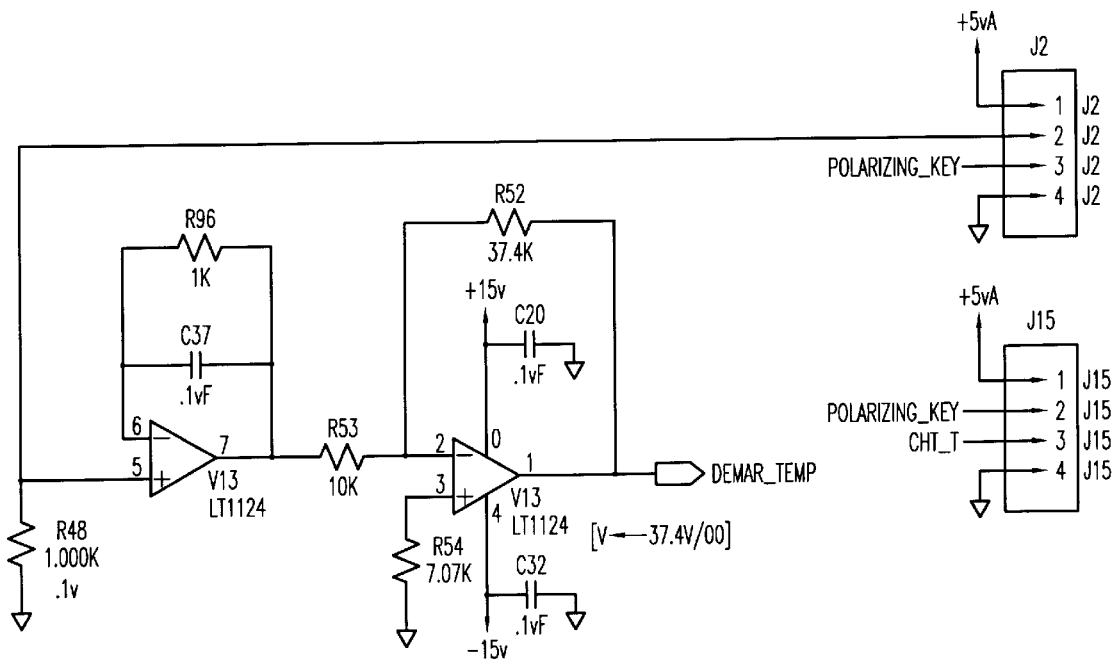
Figures 3, 5H:
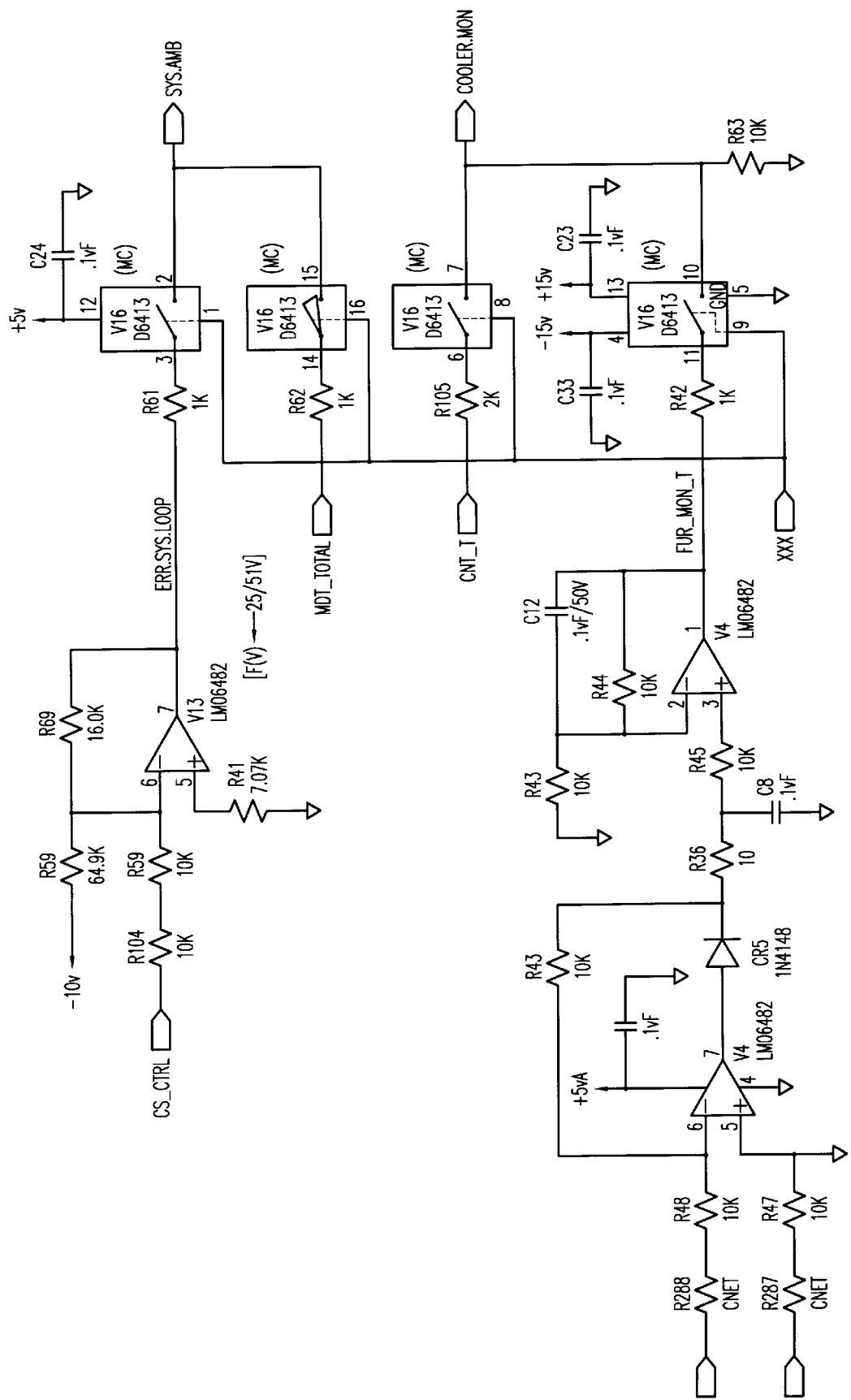
Figures 1, 6A:
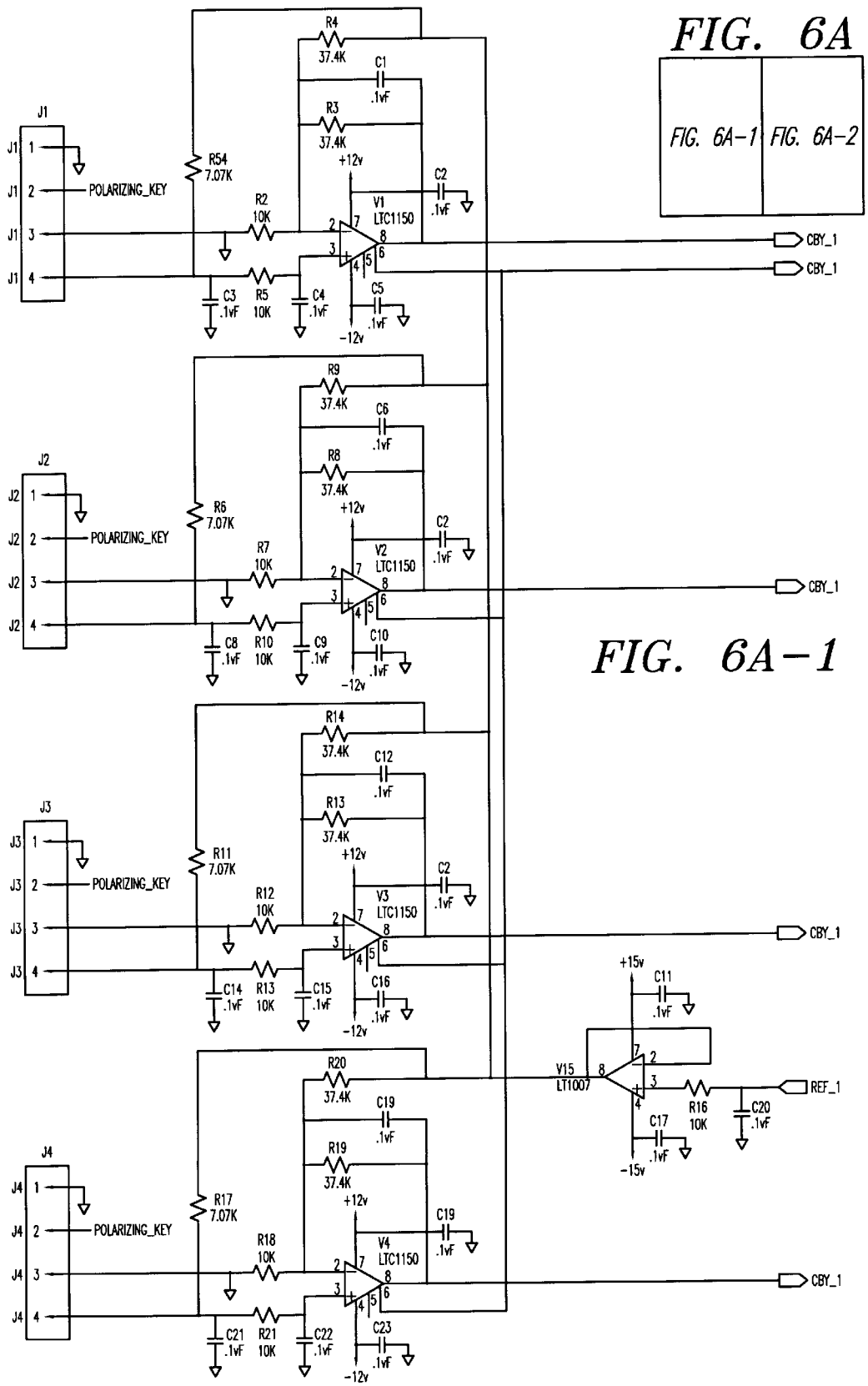
Figures 2, 6A:
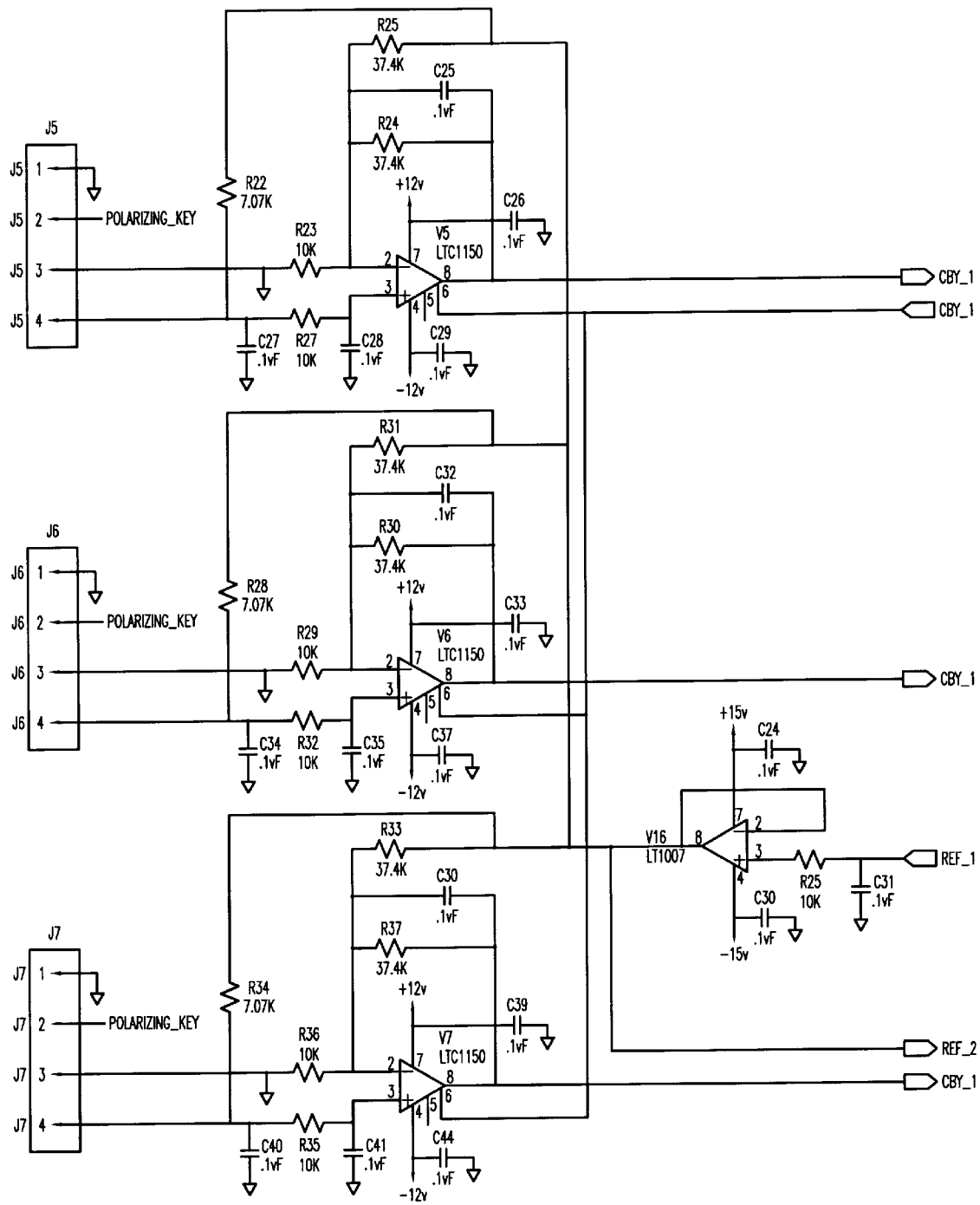
Figures 1, 6B:
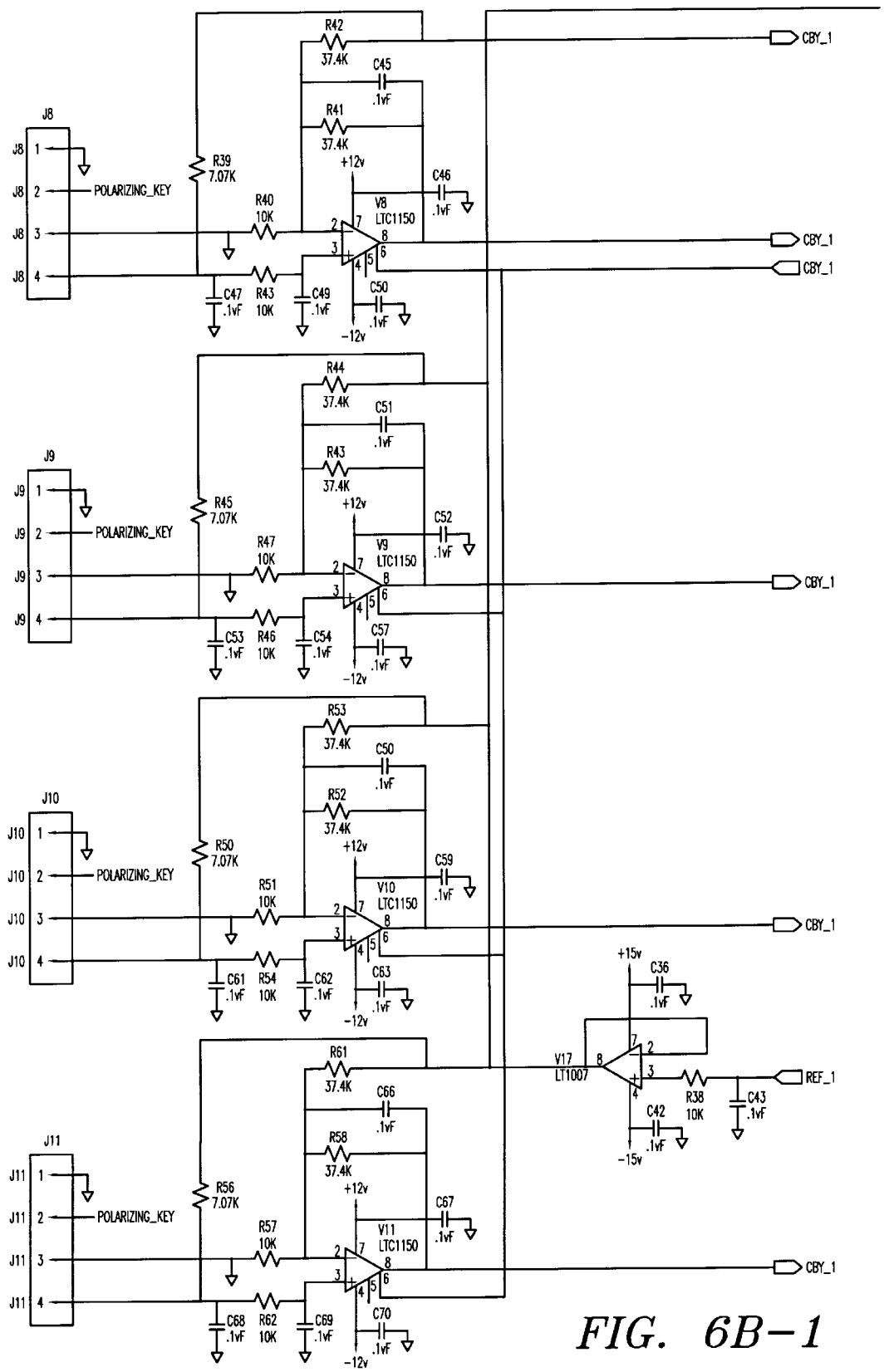
Figure 6C:
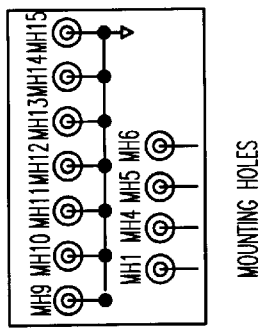
Figure 6C:
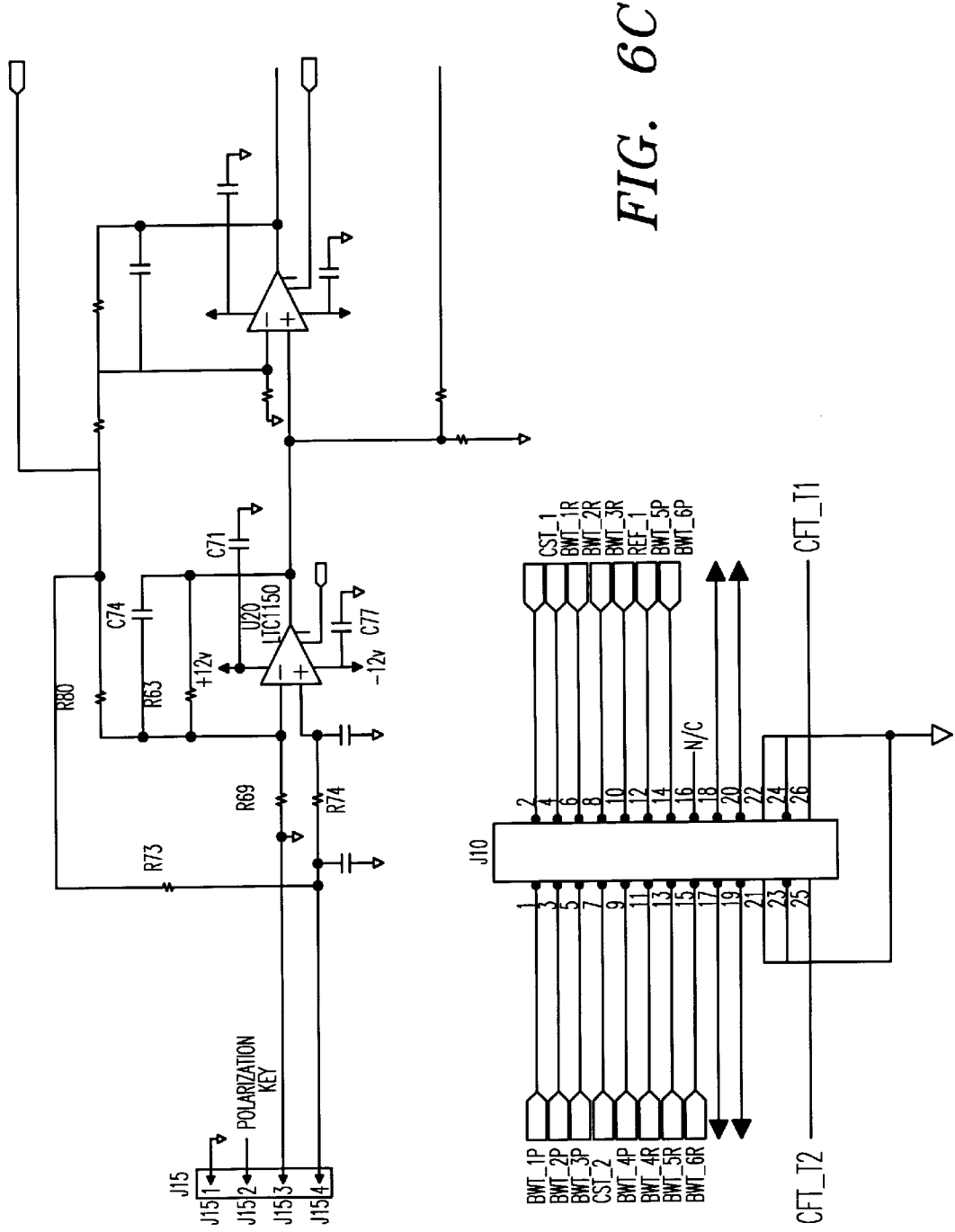

Finally, a temperature control system in accordance with the present invention may include a "filter loop," of the type described within co-pending U.S. patent application Ser. No. 08/369,004, Now U.S. Pat. No. 5,818,097 which is entitled "Temperature Controlling Cryogenic Package Systems." Moreover, each HTSC filter (not shown) may be attached to a carrier (shown in FIG. 4) that is thermally matched to the HTSC substrate. The carrier packages 90 shown, for example, in FIG. 4 are mounted on the heat-sink 10, and preferably are thermally isolated from the heat-sink 10 through the use of glass pads 92 that are provided on the mounting edges 94 of the carrier packages 90. Thick film resistors 96 and a temperature sensor 98 also are provided on the carrier packages 90, and are used to regulate with very high precision the temperatures of the carrier packages 90. Preferably, a PID controller 100 is used to regulate the voltage provided across the resistors 96 of the respective carrier packages 90 and, thus, to regulate (or fine tune) the temperatures of the respective carrier packages 90 by modulating the amount of heat provided thereto.

It will be appreciated that, because the multi-staged temperature control system 50 provides for highly accurate control of the temperature(s) of the cold stage(s), the temperature modulation provided by the filter loops need only accommodate a fairly limited range (i.e., on the order of 1° K.).

Preferably, the carrier packages 90 are designed such that the masses of the carrier packages 90 and HTSC filters (not shown) carried thereon are quite small, and such that the thermal impedance between the carrier packages 90 and the heat-sink 10 is relatively high. The net result is a filter temperature control loop which has a very fast response time and has the ability to "track out" any temperature changes that may appear on the cold stages. The filter loops also may be used to tune and/or adjust the center frequencies of the HTSC filters provided on the various carrier packages 90.

In view of the foregoing, it will be appreciated that the use of a temperature control system in accordance with the present invention provides for very precise cold stage temperature regulation, while at the same time providing and/or allowing for reduced system power consumption, high stability within all control loops, elevated filter operating temperatures (i.e., operation at temperatures approaching HTSC filter transition temperatures), and the use of very "sharp" HTSC filters.

While the invention is susceptible to various modifications and alternative forms, specific examples thereof have been shown in the drawings and are herein described in detail. It should be understood, however, that the invention is not to be limited to the particular forms or methods disclosed, but to the contrary, the invention is to cover all modifications, equivalents, and alternatives falling within the spirit and scope of the appended claims.

What is claimed is:

1. A temperature controller for use with HTSC thin film filter systems, said temperature controller comprising:
    a first control loop for controlling a cold finger temperature of a cryocooler in response to a signal received from a cold finger temperature sensor and a first reference signal; and
    a second control loop generating said first reference signal as an output in response to a signal received from a cold stage temperature sensor and a second reference signal.

2. The temperature controller of claim 1 further comprising a filter temperature control loop, said filter temperature control loop controlling a voltage provided to one or more resistors provided within a carrier package for an HTSC filter to thereby modulate a temperature of said carrier package.

3. The temperature controller of claim 1, wherein said first control loop further comprises a limiter circuit which receives as inputs an output of a first loop controller, an output of a cryocooler knock sensor circuit and an output of a cryocooler thermistor sensor circuit, and which in response to said inputs generates a signal that is provided to a multiplier circuit for amplitude modulating a sinusoidal signal that is used to drive said cryocooler.

4. A method of controlling a temperature of a cryocooler cold finger that is used to regulate a temperature of a HTSC filter system cold stage, said method comprising the steps of:
    providing a first loop for directly modulating a temperature of said cold finger in response to a comparison between a first reference signal and a signal received from a cold finger temperature sensor;
    providing a second loop for generating said first reference signal in response to a comparison between a second reference signal and a signal received from a cold stage temperature sensor; and
    using said first and second loops to control said temperature of said cold finger.

5. A method of controlling a temperature of a cryocooler cold finger that is used to regulate a temperature of a HTSC filter system cold stage, said method comprising the steps of:
    providing a first loop for directly modulating a temperature of said cold finger in response to a comparison between a first reference signal and a signal received from a first temperature sensor;
    providing a second loop for generating said first reference signal in response to a comparison between a second reference signal and a signal received from a second temperature sensor; and
    using said first loop and said second loop to control said temperature of said cold finger.

6. A temperature controller for use with HTSC thin film filter systems according to claim 1, wherein said first control loop includes a proportional controller.

7. A temperature controller for use with HTSC thin film filter systems according to claim 1, wherein said first control loop includes a proportional and derivative controller.

8. A temperature controller for use with HTSC thin film filter systems according to claim 1, wherein said second control loop includes proportional integral derivative controller.

9. A HTSC thin film filter system including a multi-stage temperature controller comprising:
    a heat-sink including a plurality of HTSC thin film filter substrates mounted thereon, the heat-sink including a main body portion and a plurality of extremities;
    a cold finger temperature sensor affixed to the main body portion of said heat-sink;
    at least one cold stage temperature sensor affixed to an external surface of one of the plurality of extremities; and
    a temperature controller further comprising:
        a first control loop for controlling a cold finger temperature of a cryocooler in response to a signal received from the cold finger temperature sensor and a first reference signal; and
        a second control loop generating said first reference signal as an output in response to a signal received from the cold stage temperature sensor and a second reference signal.

10. A HTSC thin film filter system according to claim 9, wherein the plurality of heat-sink extremities are T-shaped, radially extending extremities.

11. A HTSC thin film filter system according to claim 9 further comprising HTSC filter assembly carrier packages mounted on the plurality of extremities.

12. A HTSC thin film filter system according to claim 9, wherein the heat-sink is substantially symmetrical.

13. A HTSC thin film filter system according to claim 11 further comprising a resistor and a temperature sensor mounted on at least one of the carrier packages to regulate the temperature of the carrier packages.

14. A HTSC thin film filter system according to claim 13 further including a proportional integral derivative controller for regulating the voltage across the resistor.

15. A method of controlling the temperature of a cryocooler cold finger that is used to regulate the temperature of a HTSC filter system cold stage, the method comprising the steps of:
    measuring the temperature of at least one cold stage;
    inputting a signal corresponding to the temperature of at least one cold stage to a first controller;
    comparing the temperature of the at least one cold stage with a reference signal input to the first controller;
    outputting an output signal based on the said comparison to a second controller;
    measuring the temperature of the cold finger;
    inputting a signal corresponding to the temperature of the cold finger to the second controller; and
    outputting a signal to the cryocooler from the second controller to vary the lift of the cryocooler based on the signal corresponding to the temperature of the cold finger and the output signal from the first controller.

* * * * *

UNITED STATES PATENT AND TRADEMARK OFFICE
Certificate

Patent No. 6,098,409

Patented: August 8, 2000

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: David Chase, Santa Barbara, CA; and Glenn A. Sanderson, Santa Barbara, CA.

Signed and Sealed this Fourth Day of September 2001.

HENRY BENNETT
*Supervisory Patent Examiner*
Art Unit 3749